United States Patent [19]
Villeneuve et al.

[11] Patent Number: 6,130,969
[45] Date of Patent: Oct. 10, 2000

[54] HIGH EFFICIENCY CHANNEL DROP FILTER

[75] Inventors: Pierre R. Villeneuve, Boston; Shanhui Fan, Somerville; John D. Joannopoulos, Belmont; Hermann A. Haus, Lexington, all of Mass.

[73] Assignee: Massachusetts Institute of Technology, Cambridge, Mass.

[21] Appl. No.: 08/968,314

[22] Filed: Nov. 12, 1997

Related U.S. Application Data

[63] Continuation-in-part of application No. 08/871,747, Jun. 9, 1997, abandoned.

[51] Int. Cl.[7] .................................................. G02B 6/293
[52] U.S. Cl. ................................ 385/27; 385/24; 385/39; 385/50
[58] Field of Search ........................... 385/15, 24, 27–29, 385/39, 50; 343/909

[56] References Cited

U.S. PATENT DOCUMENTS

| | | | |
|---|---|---|---|
| 3,589,794 | 6/1971 | Marcatili | 385/42 |
| 4,097,826 | 6/1978 | Knox et al. | 333/202 |
| 4,720,160 | 1/1988 | Hicks | 385/31 |
| 4,759,596 | 7/1988 | Po et al. | 385/37 |
| 4,772,863 | 9/1988 | Rosenberg et al. | 333/212 |
| 4,799,749 | 1/1989 | Borner et al. | 385/14 |
| 5,187,461 | 2/1993 | Brommer et al. | 333/219.1 |
| 5,389,943 | 2/1995 | Brommer et al. | 343/909 |
| 5,440,421 | 8/1995 | Fan et al. | 359/344 |
| 5,471,180 | 11/1995 | Brommer et al. | 333/202 |
| 5,506,712 | 4/1996 | Sasayama et al. | 359/123 |
| 5,600,483 | 2/1997 | Fan et al. | 359/344 |
| 5,682,401 | 10/1997 | Joannopoulos et al. | 372/96 |
| 5,712,648 | 1/1998 | Tsujiguchi | 343/909 |
| 5,721,796 | 2/1998 | de Barros et al. | 385/37 |
| 5,742,633 | 4/1998 | Stone et al. | 372/92 |
| 5,748,057 | 5/1998 | De Los Santos | 333/134 |
| 5,784,400 | 7/1998 | Joannopoulos et al. | 372/96 |

FOREIGN PATENT DOCUMENTS 196 34 893  5/1997  Germany.

OTHER PUBLICATIONS

1995 IEEE LEOS Annual Meeting; vol. 2; Nov. 1–2, "Micro–Ring Resonator Channel Dropping Filters" by: B.E. Little, S.T. Chu and H.A. Haus.

Journal of Lightwave Technology, vol. 15, No. 6, Jun. 1997; "Microring Resonator Channel Dropping Filters" B.E. Little, S.T. Chu, H.A. Haus, J. Foresi and J.P. Laine.

(List continued on next page.)

Primary Examiner—John D. Lee
Assistant Examiner—Michael J. Stahl
Attorney, Agent, or Firm—Samuels, Gauthier & Stevens, LLP

[57] ABSTRACT

A highly efficient channel drop filter. The filter employs a coupling element including a resonator-system between two waveguides, which contains at least two resonant modes. The resonator-system includes one or more interacting resonant cavities which in addition to being coupled to the waveguides, can also be coupled directly among themselves and indirectly among themselves via the waveguides. Each component of the coupling element can be configured or adjusted individually. The geometry and/or dielectric constant/refractive index of the resonator-system are configured so that the frequencies and decay rates of the resonant modes are made to be substantially the same. The filter can achieve 100% signal transfer between the waveguides at certain frequencies, while completely prohibiting signal transfer at other frequencies. In exemplary embodiments, the filter is configured with photonic crystals. In accordance with alternative embodiments of the invention, there are provided channel drop filter devices with flat-top and straight-sidewall lineshape characteristics. These lineshape characteristics are realized by using several resonances to couple the waveguides, and by designing the relative positioning of the frequency of each resonance with respect to one another.

52 Claims, 14 Drawing Sheets

OTHER PUBLICATIONS

Fan et al., "Theoretical Investigation of Fabrication–Related disorder on the properties of Photonic Crystals," *J. Appl. Physics,* vol. 78(3), (Aug. 1995): 1415–1418.

Koops, H. W. P., "Photonic Crystals Built By Three–Dimensional Additive Lithography Enable Integrated Optics if High Density," vol. 2849, (Aug. 5, 1996): 248–256.

Villeneuve et al., "Microcavities in Photonic Crystals: Mode Symmetry, Tunability, and Coupling Efficiency," *Physical Review B,* vol. 54 No. 11, (Sep. 1996): 7837–7842.

Villeneuve et al., "Single–Mode Waveguide Microcavity for Fast Optical Switching," *Optics Letters,* vol. 21 No. 24, (Dec. 1996):2017–2019.

Physical Review B, vol. 54, No. 11, Sep. 15, 1996, pp. 7837–7842, "Microcavities in photonic crystals: Mode symmetry, tunability, and coupling efficiency" by Villeneuve et al.

J. Appl. Phys. vol. 78(3), Aug. 1, 1995, pp. 1415–1418, "Theorectical investigation of fabrication–related disorder on the properties of photonic crystals", by Fan et al.

Optics Letters, vol. 21, No. 24, Dec. 15, 1996, pp.2017–2019, "Single–mode waveguide microcavity for fast optical switching", by Villeneuve et al.

-MAX     0     MAX

HIGH EFFICIENCY CHANNEL DROP FILTER

PRIORITY INFORMATION

This application is a continuation-in-part of U.S. patent application Ser. No. 08/871,747, filed Jun. 9, 1997, now abandoned.

SPONSORSHIP INFORMATION

This invention was made with government support under Grant No. 9400334-DMR awarded by National Science Foundation. The government has certain rights in the invention.

BACKGROUND OF THE INVENTION

The invention relates to channel drop filters, and in particular to a highly efficient resonator-system channel drop filter. In exemplary embodiments, photonic crystal channel drop filters are provided.

The increasing interest in photonic integrated circuits (PICs) and the increasing use of all-optical fiber networks as backbones for global communication systems have been based in large part on the extremely wide optical transmission bandwidth provided by dielectric materials. This has accordingly led to an increased demand for the practical utilization of the full optical bandwidth available. In order to increase the aggregate transmission bandwidth, it is generally preferred that the spacing of simultaneously transmitted optical data streams, or optical data channels, be closely packed, to accommodate a larger number of channels. In other words, the difference in wavelength between two adjacent channels is preferably minimized.

Channel dropping filters (CDFs) that access one channel of a wavelength division multiplexed (WDM) signal, and do not disturb the other channels, are essential components of PICs and optical communication systems. Among various devices introduced recently, resonant filters are attractive candidates for channel dropping because they can potentially be used to select a single channel with a very narrow linewidth. A schematic block diagram of a resonator-system CDF 10 is shown in FIG. 1, where two waveguides, the bus 12 and the drop 14, are coupled through a resonator-system 16 having one or more resonant cavities. While WDM signals (i.e. multi-frequency signals) propagate inside one waveguide (the bus), a single mode is transferred out of the bus and into the other waveguide (the drop), either in the forward or backward propagation direction, while completely prohibiting cross talk between the bus and the drop for all other frequencies.

The performance of a CDF is determined by the transfer efficiency between the two waveguides. Perfect efficiency corresponds to 100% transfer of the selected channel into either the forward or backward direction in the drop, with no transmission or back reflection into the bus. All other channels should remain unaffected by the presence of the optical resonator.

SUMMARY OF THE INVENTION

The invention provides a highly efficient channel drop filter. The filter employs a coupling element including a resonator-system between two waveguides, which contains at least two resonant modes. The resonator-system includes one or more interacting resonant cavities which in addition to being coupled to the waveguides, can also be coupled directly among themselves and indirectly among themselves via the waveguides. Each component of the coupling element can be configured or adjusted individually. The geometry and/or dielectric constant/refractive index of the resonator-system are configured so that the frequencies and decay rates of the resonant modes are made to be substantially the same. The filter can achieve 100% signal transfer between the waveguides at certain frequencies, while completely prohibiting signal transfer at other frequencies. In exemplary embodiments, the filter is configured with photonic crystals.

In accordance with alternative embodiments of the invention, there are provided channel drop filter devices with flat-top and straight-sidewall lineshape characteristics. These lineshape characteristics are realized by using several resonances to couple the waveguides, and by designing the relative positioning of the frequency of each resonance with respect to one another. The usage of multiple resonances also allows the design of optical switches. These devices can switch the signal from a forward to a backward direction, or from a complete to a zero transfer.

Accordingly, in one embodiment of the invention there is provided an electromagnetic field frequency filter which includes an input waveguide which carries a signal having a plurality of modes including a desired guided mode, and an output waveguide. A resonator-system is coupled between the input and output waveguides which transfers the desired guided mode to the output waveguide and allows transmission of the remaining frequencies through the input waveguides. The resonator-system includes an external sub-element that couples with the input waveguide, the external sub-element having a local mirror plane perpendicular to the waveguides, and defines at least two local resonant modes of opposite symmetry with respect to the mirror plane, the resonant modes having components which cancel in the backward direction of the input waveguide.

DETAILED DESCRIPTION OF THE ILLUSTRATED EMBODIMENTS

The invention provides a design of a resonator-system CDF (along with its basic properties) which achieves maximum transfer efficiency. The design is based on a rigorous symmetry and computational analysis. The CDF in accordance with the invention uses a coupling element between two waveguides, which has at least two resonant modes. The resonator-system includes one or more interacting resonant cavities which in addition to being coupled to the waveguides, can also be coupled directly among themselves and indirectly among themselves via the waveguides. Each component of the coupling element can be configured or adjusted individually. The geometry and/or dielectric constant/refractive index of the resonator-system are configured so that the frequencies and decay rates of the resonant modes are made to be substantially the same.

It will be shown that, in certain cases such as in the case of a photonic crystal CDF, transfer efficiencies of 100% can be achieved. Two specific embodiments using photonic crystals will be presented, as well as an embodiment which is a combination of a photonic crystal resonator-system and conventional waveguides. An embodiment will also be presented which uses nonlinear materials to achieve tuning of the CDF.

Figure 1:
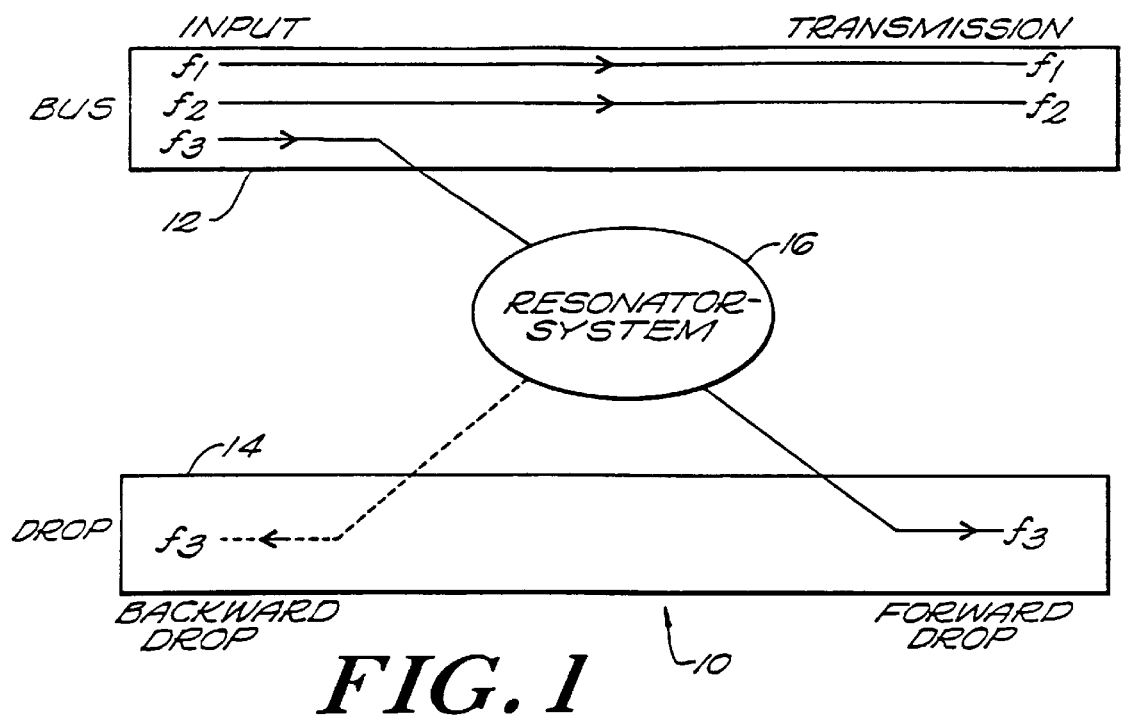
FIG. 1 is a schematic block diagram of a generic resonator-system CDF.

Initially, the generic CDF structure 10 shown in FIG. 1 must be considered to determine the basic properties required to achieve 100% transfer efficiency. At the resonant frequency, the guided mode inside the bus waveguide 12 excites the modes of the resonator-system 16. In turn, the resonator-system modes decay both into the bus waveguide 12 and into the drop waveguide 14.

The transmitted signal is composed of the input signal and the signal which originates from the decay of the resonator-system modes. By properly configuring the resonator-system, it is possible for these signals to interfere destructively and cancel each other, resulting in zero transmission as required. The reflected signal, on the other hand, originates entirely from the decay of the resonator-system mode. To achieve perfect transfer efficiency, the resonator-system is configured such that the resonator-system signal does not decay into the backward direction in the bus.

In order to achieve zero transmission and zero reflection, it is necessary to have a structure with modes of opposite symmetry. Consider the case in which the structure of FIG. 1 has mirror-plane symmetry perpendicular to the waveguides, and that the resonator-system supports two resonant states, one with even symmetry, whose electromagnetic field is labelled |even>, and one with odd symmetry, whose electromagnetic field is labelled |odd>, with respect to the mirror plane. Examples of even and odd states are shown in FIGS. 2A and 2B, which are schematic diagrams of contour plots of the resonant mode field patterns in a CDF structure having a mirror-plane symmetry perpendicular to the waveguides, and a resonator-system supporting two resonant states by using two interacting cavities each of which support a monopole mode, and by using one cavity which supports a doubly degenerate hexapole mode, respectively.

Figure 2A:
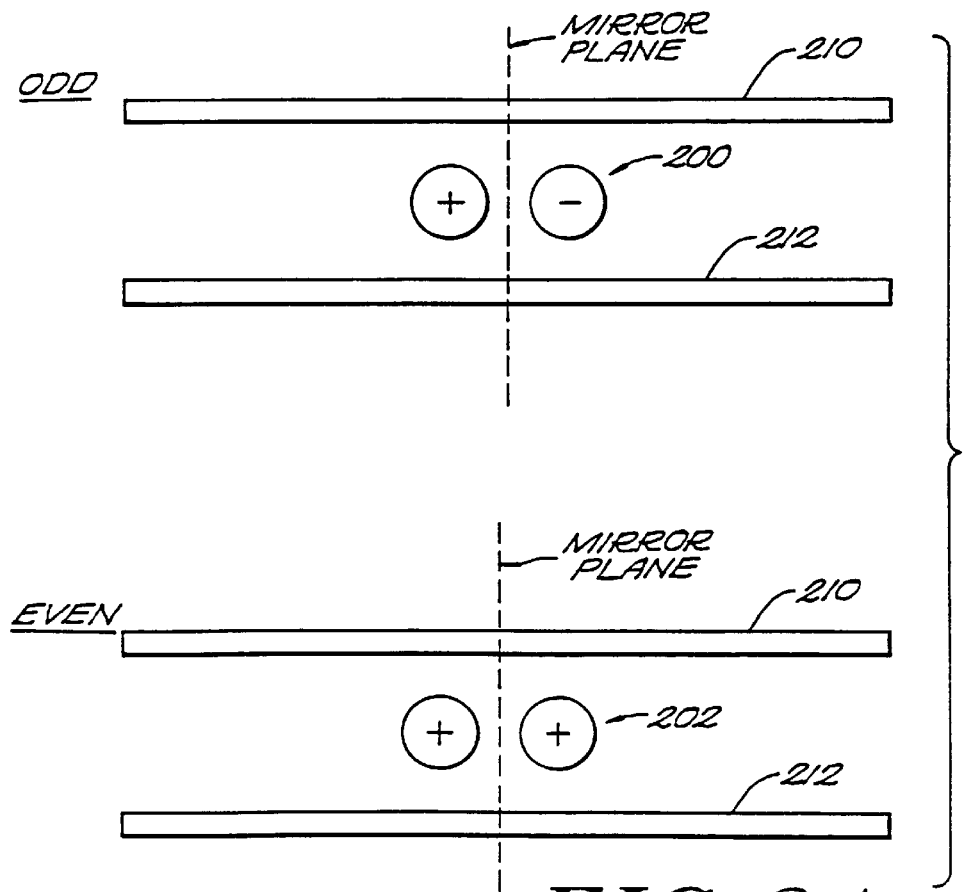
FIGS. 2A and 2B are schematic diagrams of contour plots of the resonant mode field patterns in a CDF structure having a mirror-plane symmetry perpendicular to the waveguides, and a resonator-system supporting two resonant states by using two interacting cavities each of which support a monopole mode, and by using one cavity which supports a doubly degenerate hexapole mode, respectively.
Figure 2B:
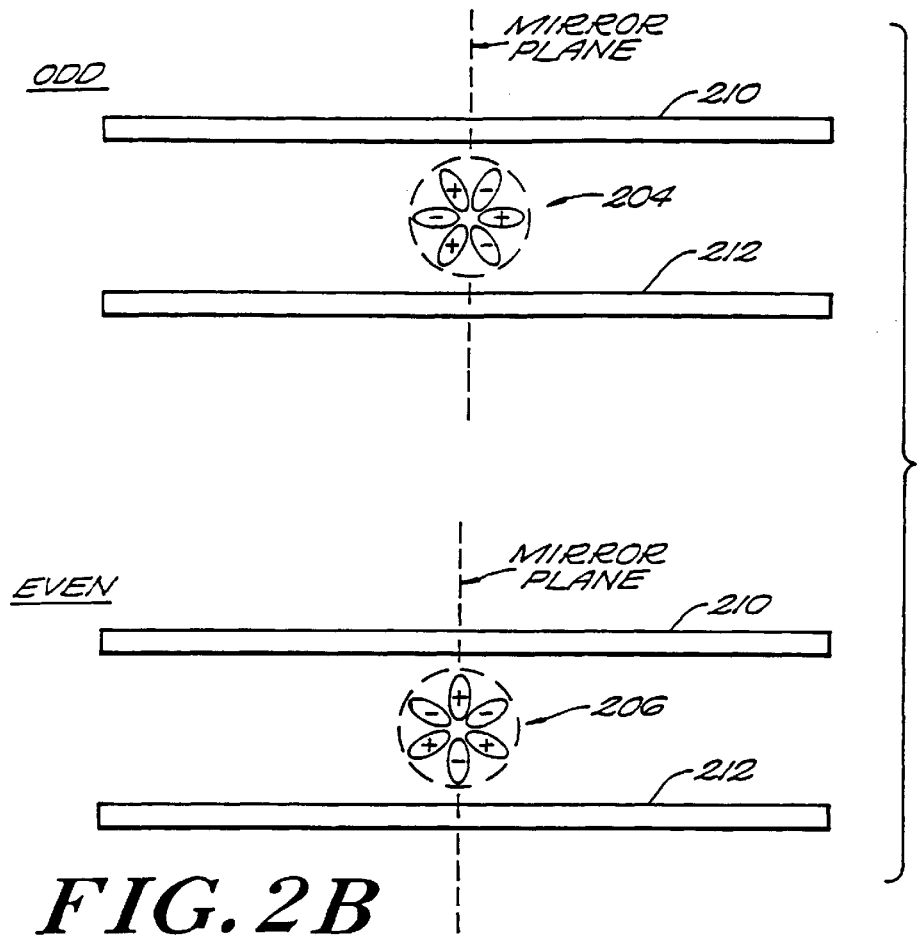

FIG. 2A shows the odd 200 and even 202 field patterns of a structure with two coupled cavities supporting monopole modes, and FIG. 2B shows the odd 204 and even 206 field patterns of a structure with a single cavity supporting a doubly-degenerate hexapole mode. The + and − signs indicate the sign of the field. The two rectangles adjacent the field patterns represent the bus 210 and drop 212 waveguides.

An incoming wave $e^{ikx}$ can then be decomposed into the form $\cos(kx)+i\sin(kx)$, where x corresponds to the direction along the waveguides. The $\cos(kx)$ part, which is even with respect to the mirror plane, couples only to the even resonant state. The $\sin(kx)$ part, on the other hand, is odd, and couples only to the odd resonant state. In the specific case where the coupling constants are equal for both modes, a resonant state of the form |even>+i|odd> is excited, which in turn decays only along the forward direction in the input waveguide. As a consequence, reflection is completely absent.

Maximum CDF efficiency can be achieved, provided that the following hold true. First, the structure possesses at least one mirror plane perpendicular to the waveguides, and supports at least two resonant states of opposite symmetry. Second, the two states have substantially the same frequency. Third, the two states have substantially the same quality factor, determined from the decay of the resonances into the waveguide modes.

Figure 3:
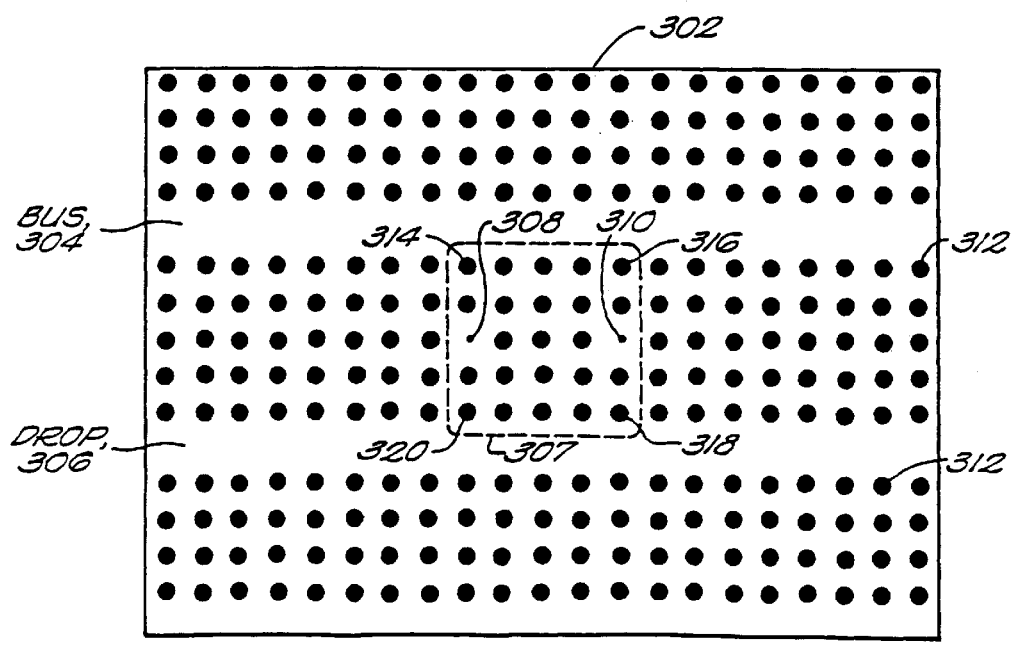
FIG. 3 is a plan view diagram of an exemplary embodiment of a resonator-system photonic crystal CDF in accordance with the invention.

An exemplary embodiment of a resonator-system photonic crystal CDF 300 in accordance with the invention is shown in FIG. 3 in top plan view. The CDF 300 includes a photonic crystal 302 having two waveguides, a bus 304 and a drop 306. The CDF also includes a resonator-system 307 which has two point defects or cavities 308, 310. In contrast to other types of resonant cavities, photonic crystal cavities can be truly single mode as described in Villeneuve et al., "Microcavities in photonic crystals: Mode symmetry, tunability, and coupling", Phys. Rev. B 54, 7837 (1996), incorporated herein by reference. Furthermore, photonic crystal cavities do not suffer from intrinsic radiation losses, and are somewhat insensitive to fabrication-related disorder as described in Fan et al., "Theoretical investigation of fabrication-related disorder on the properties of photonic crystals", Journal App. Phys. 78, 1415 (1995), incorporated herein by reference.

In the illustrated embodiment, the photonic crystal 302 is configured as a square lattice of high-index dielectric posts 312 on a substrate such as silicon. The posts have a radius of 0.20a and a dielectric constant of 11.56, where a is the lattice constant. Two rows of posts are removed to form the waveguides. The coupling element is introduced between the waveguides by altering two posts, thereby defining cavities 308, 310. Each of the cavities has a radius of 0.05a and a dielectric constant of 6.6. The cavities are five lattice constants apart and two lattice constants away from the waveguide on each side. Each cavity supports a localized monopole state which is singly degenerate. The even (odd) state is composed of an even (odd) linear combination of the two monopoles.

As will be appreciated by those of skill in the art, such a CDF can be fabricated with a photonic crystal in which the contrasting dielectric constants can be achieved by creating channels or holes within a first dielectric material and filling the channels or holes with air or a second dielectric material having a different refractive index than the first material. Examples of various photonic crystal structures and methods of fabrication are found in U.S. Pat. Nos. 5,187,461, 5,389,943, 5,440,421, 5,600,483, and U.S. patent application Ser. Nos. 08/395,441 and 08/665,529, all of which are incorporated herein by reference.

Figure 4:
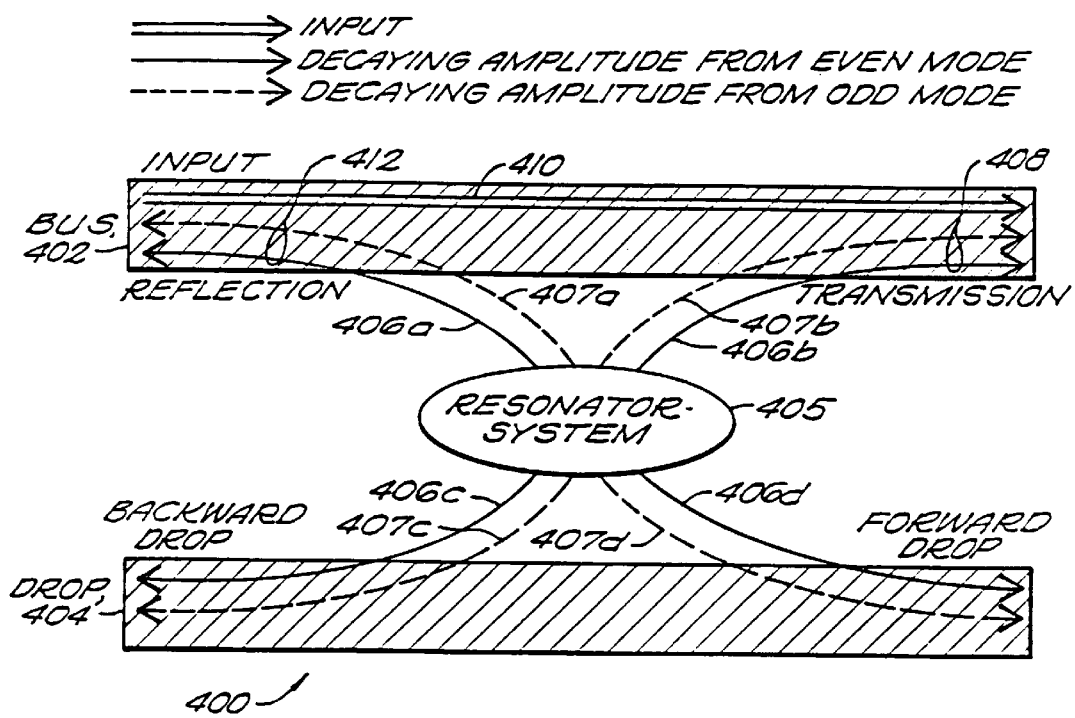
FIG. 4 is a schematic diagram of the physics mechanism for channel dropping in an exemplary filter having a resonator-system supporting one even and one odd degenerate mode.

FIG. 4 is a schematic block diagram of the physics mechanism used for channel dropping in accordance with the invention for an exemplary filter having a resonator-system 405 supporting one even and one odd mode of substantially the same frequency. The schematic includes a channel drop filter 400 having a bus waveguide 402, a drop waveguide 404, and the resonator-system 405 coupled therebetween. At the resonant frequency, the guided mode inside the bus excites both the even and odd modes. In turn, the even 406a–406d and odd 407a–407d modes of the resonator-system decay substantially equally both into the bus and into the drop.

The transmitted signal 408 is composed of three parts, the input signal 410 and the signals 406b and 407b which originate from the decay of the resonator-system modes. These three parts interfere destructively, resulting in zero transmission. The reflected signal 412, on the other hand, is composed of two parts, signals 406a and 407a which originate from the decay of the resonator-system modes. Under the condition that the even and odd states have substantially the same frequency and substantially the same quality factor, as described heretofore, these two parts cancel, resulting in zero reflection. In the exemplary embodiment, there is no signal in either the backward or forward direction in the drop. The choice of direction will depend on the phase of the decaying amplitudes from the even and odd modes into the bus and the drop.

The two cavities 308 and 310 of the CDF 300 shown in FIG. 3 are coupled indirectly through the waveguides, and directly through the crystal. Each coupling mechanism splits the frequency (i.e. breaks the degeneracy) of the even and odd states, but with an opposite sign. The exact cancellation between the two coupling mechanisms is ensured by changing the dielectric constant of four individual posts 314, 316, 318, 320 in the photonic crystal from 11.56 to 9.5. Alternatively, the radius or shape of the four individual posts could be reduced in order to achieve the same results.

Analytically, it can be shown that the quality factor of the two states can be made equal provided that the wavevector k of the guided mode satisfies the relation $k \cdot d = n\pi + \pi/2$, where d is the distance between the two cavities (defects), and n is an integer. This condition can be met by separating the two cavities by five lattice constants, and by choosing and altering the size and dielectric constant of the defect posts in such a way that the guided mode at the resonant frequency has a wavevector of 0.25 $(2\pi a^{-1})$.

Figure 5:
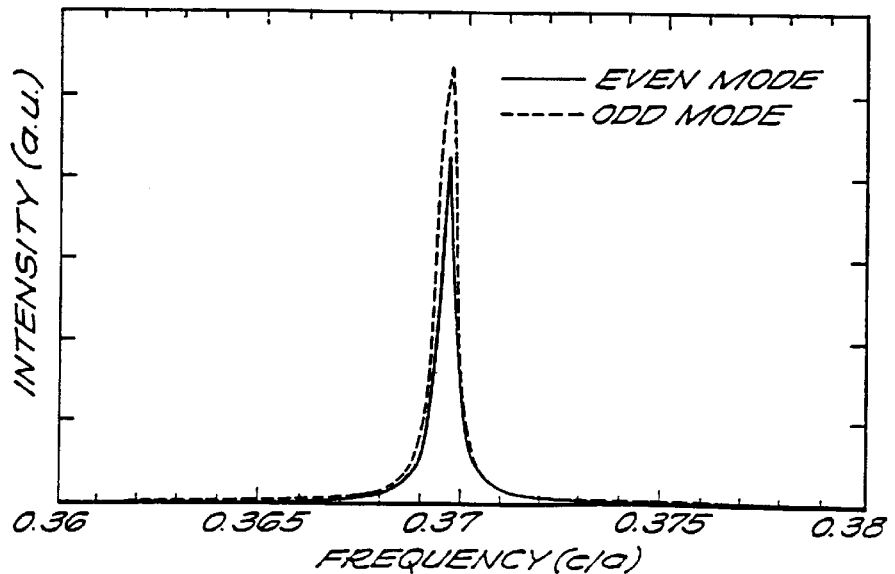
FIG. 5 is a graph of the frequency spectrum of the even and odd modes for the CDF of FIG. 3.

To verify these assumptions, the filter response of the exemplary structure shown in FIG. 3 is computed using a finite-difference time-domain scheme. A pulse is sent down one of the waveguides and excites both the even and odd states. These two states then decay exponentially into the waveguides. By Fourier transforming the decaying amplitudes, the frequency spectrum of the even and odd modes for the structure 300 can be found, each with a Lorentzian lineshape, as shown in the graph of FIG. 5. The two line shapes overlap almost completely, as desired.

Figure 6A:
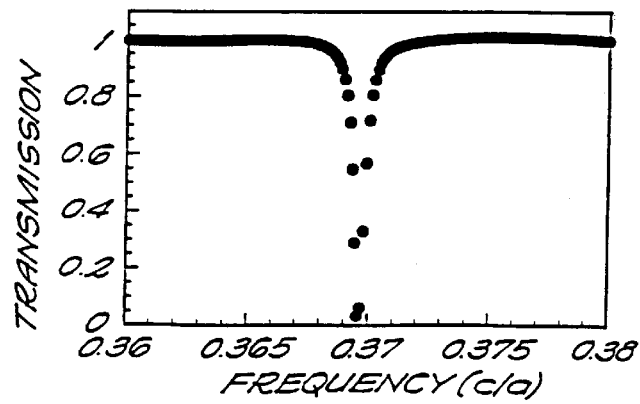
FIGS. 6A–6C are graphs of the spectrum of transmitted signal, and the signal in the forward and backward drops, respectively, for the CDF shown in FIG. 3.
Figure 6B:
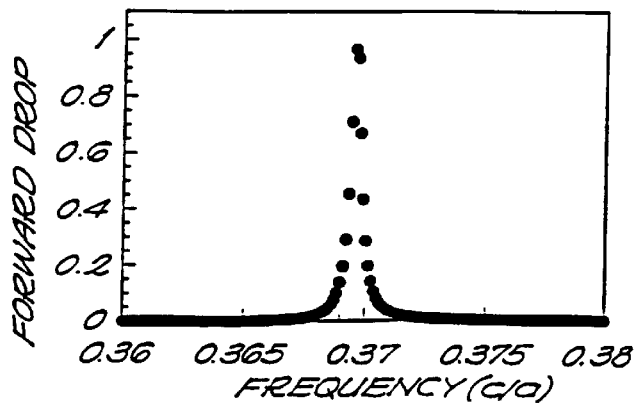
Figure 6C:
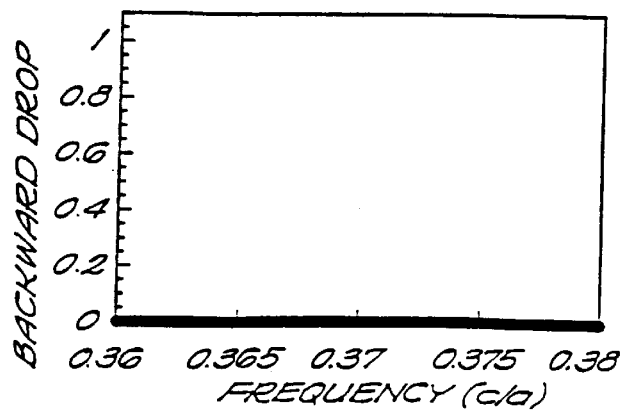

The spectrum of the transmitted signal, and the signal in the forward and backward drops are shown in the graphs of FIGS. 6A–6C, respectively. The transmission efficiency is close to 100% over the entire spectrum, except at the resonant frequency, where it drops to 0% as shown in FIG. 6A. The forward drop shows a Lorentzian lineshape with a maximum close to 100% at resonance. The quality factor is larger than 1000 as shown in FIG. 6B. The backward drop shows almost complete absence of signal as shown in FIG. 6C.

Figure 7:
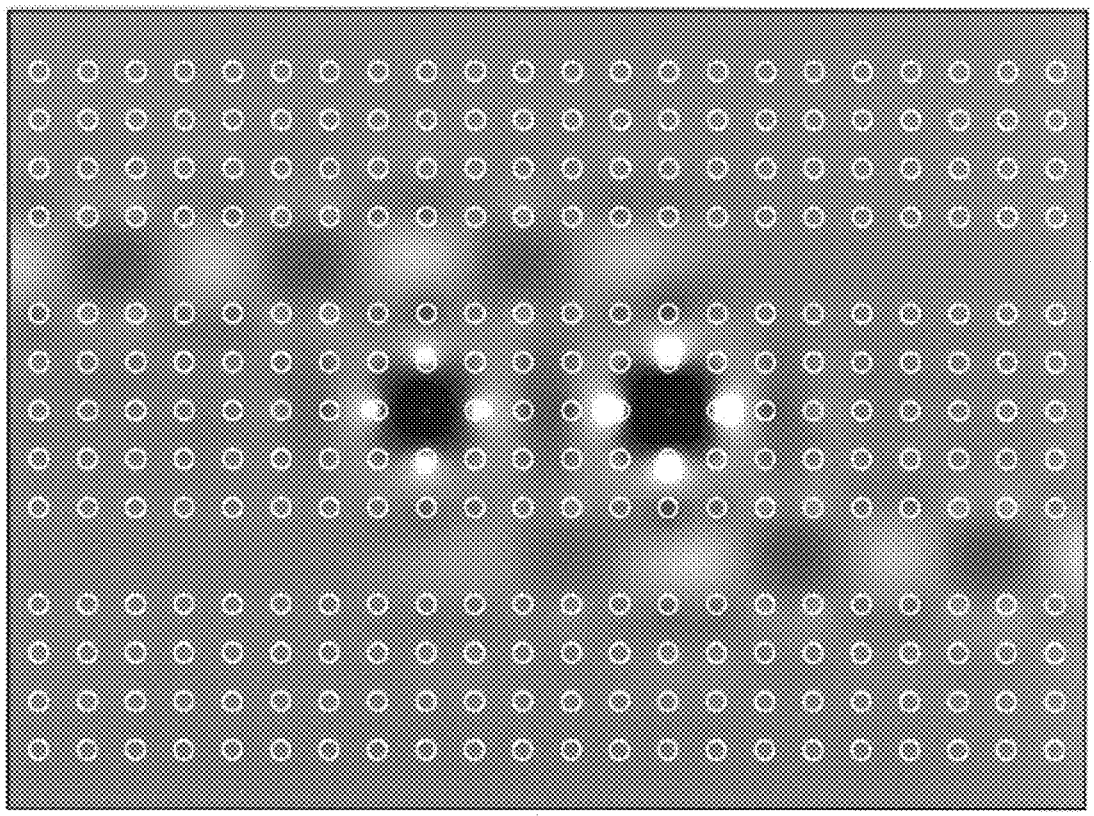
FIG. 7 is a computed electric field pattern at the resonant frequency of the CDF shown in FIG. 3.
Figure 7:

FIG. 7 shows a computed electric field pattern at the resonant frequency of the CDF 300 of FIG. 3. The electric field exhibited is at maximum transfer efficiency at a steady-state frequency of 0.3696c/a. The power is completely transferred from the bus to the drop. The simulation demonstrates the behavior of an ideal channel drop filter.

Figure 8:
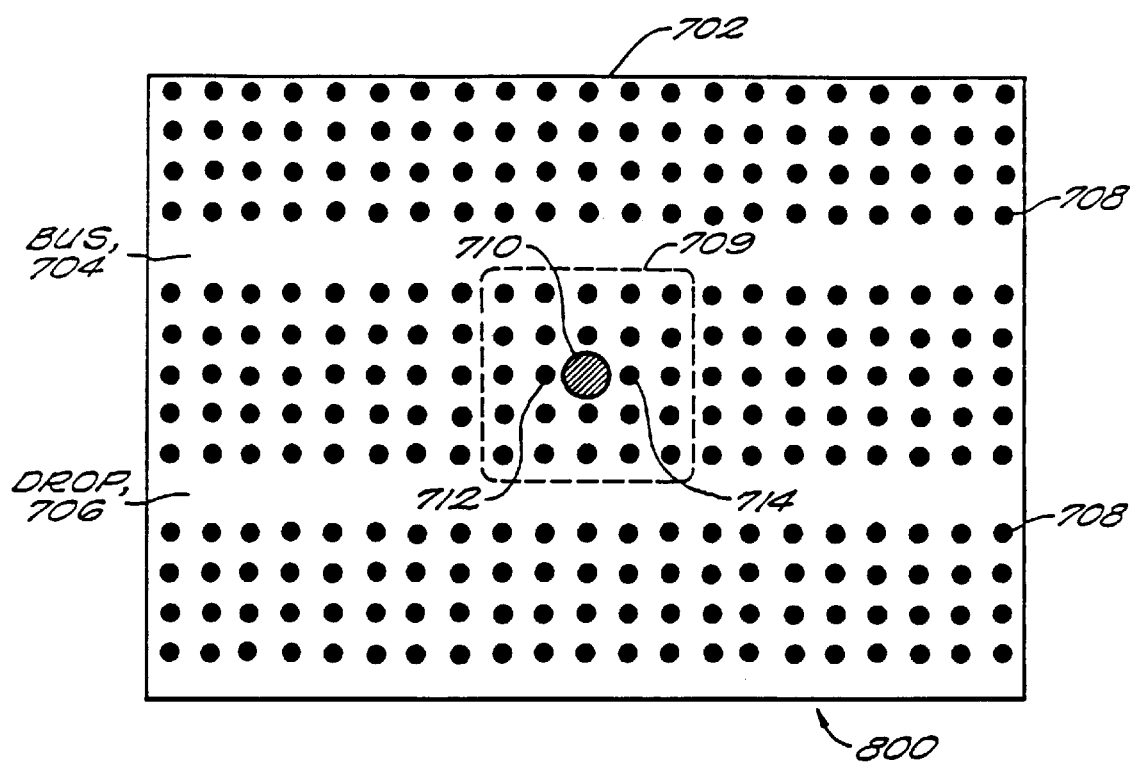
FIG. 8 is a plan view diagram of an alternative exemplary embodiment of a resonator-system photonic crystal CDF in accordance with the invention.

FIG. 8 is an alternative exemplary embodiment of a resonator-system photonic crystal CDF 700 in accordance with the invention shown in plan view. The CDF 700 includes a photonic crystal 702 having two waveguides, a bus 704 and a drop 706. The photonic crystal 702 is configured as a square lattice of high-index dielectric posts 708. The posts have a radius of 0.20a and a dielectric constant of 11.56, where a is the lattice constant. Two rows of posts are removed to form the waveguides. The coupling element between the two waveguides is a resonator-system 709 which consists of a single cavity 710 with two doubly-degenerate modes (i.e. two modes with the same frequency). The cavity is made by increasing the radius of a single post from 0.20a to 0.60a. Alternatively, the cavity can be configured by changing the dielectric constant of a single post. For the illustrated embodiment, the dielectric constant would be increased. Also, as described above, the photonic crystal can be fabricated with channels or holes of air or material having a contrasting dielectric constant.

Figure 9:
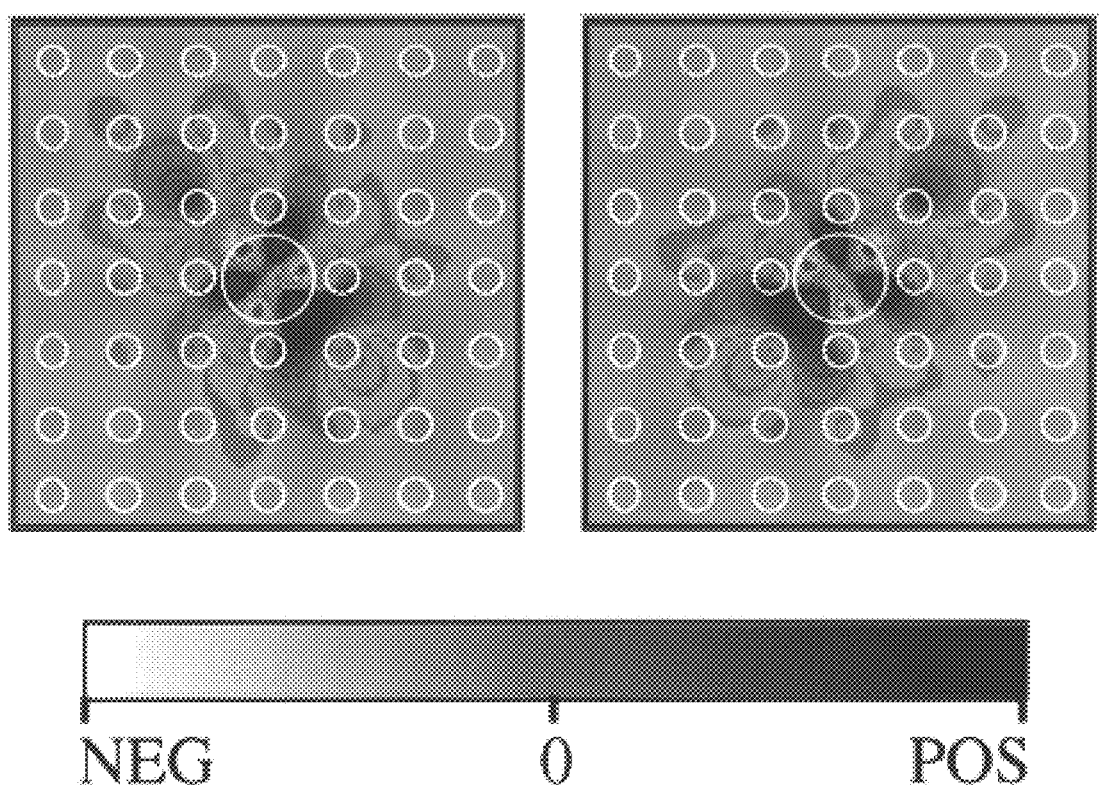
FIG. 9 is a computed electric field pattern of the modes of the resonator-system of the CDF shown in FIG. 8.

FIG. 9 shows a computed electric field pattern of the modes of the resonator-system of the CDF 700 shown in FIG. 8 without the presence of the waveguides. The field pattern illustrates the two doubly-degenerate modes of the resonator-system of the CDF 700 in the absence of the waveguides. Since one of these modes is even and the other odd, the exemplary structure resulting in the field pattern shown in FIG. 9 satisfies the first and second conditions of achieving maximum CDF efficiency, namely the structure possesses at least one mirror plane, and supports at least two resonant modes of opposite symmetry, and the two modes have the same frequency. However, in the presence of waveguides, the degeneracy is broken and the two modes couple differently to the waveguides, hence they have different quality factors. This will have the effect of reducing the transfer efficiency below 100%. The transfer efficiency can be optimized by changing the shape of the cavity, and/or by changing the size or the dielectric constant of neighboring posts so that the resonant modes have substantially the same frequency.

Figure 10:
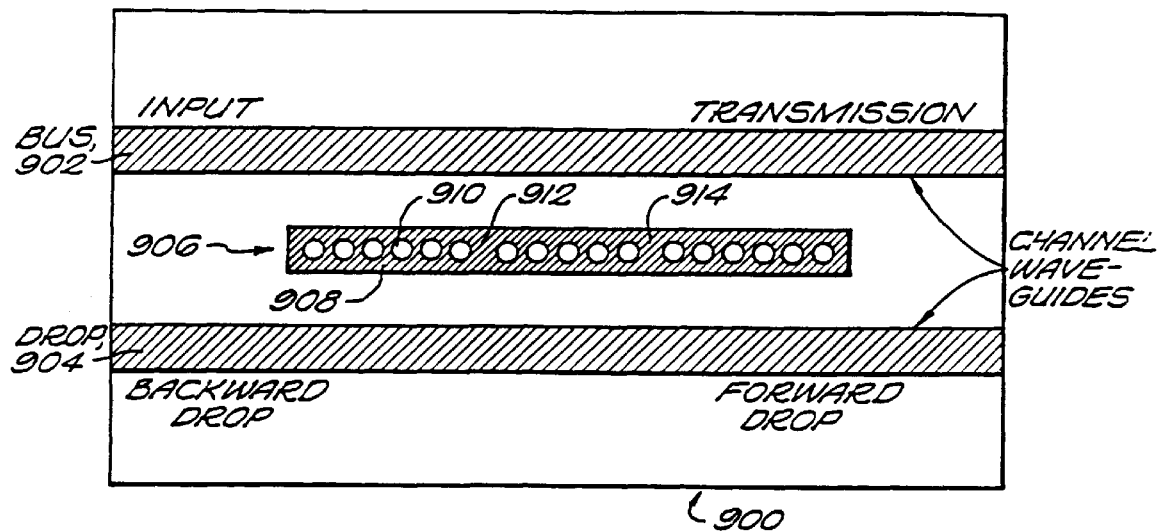
FIG. 10 is a plan view diagram of another alternative exemplary embodiment of a resonator-system CDF in accordance with the invention.

FIG. 10 is another exemplary embodiment of a resonator-system CDF 900 in accordance with the invention. The CDF 900 includes two waveguides, a bus 902 and a drop 904. The waveguides are conventional channel waveguides made of high dielectric material on a substrate such as silicon. A coupling element in the form of a resonator-system 906 is configured from a photonic crystal including a dielectric region 908 with a periodic series of holes 910. Within the array of holes, two defects 912, 914 have been introduced by breaking the periodicity. These two defects serve as cavities. Alternatively, the holes can be replaced with rods as described above.

The efficiencies of all the aforementioned exemplary embodiments of the invention are optimized by configuring and selecting parameters for the geometry and/or the refractive index of the resonator-system. By choosing the appropriate geometries and/or refractive indices for the resonator-system, the frequencies of the degenerate modes will be made to be substantially the same in accordance with the criteria for efficiency. In addition, the geometry and refractive index configuration of the resonator-system are configured so that the decay or dissipation rates (quality factors) of the degenerate modes are substantially the same into the bus and drop waveguides.

Accordingly, the CDF 300 of FIG. 3 can be configured such that the posts 314, 316, 318, and 320 are of varying geometry, i.e., size and shape, with respect to the remaining posts 312, rather than of varying dielectric constant as described. Furthermore, the CDF 700 of FIG. 8 can be optimized by configuring the geometries and/or refractive indices of the posts adjacent to the cavity 710. For example, posts 712 and 714 can be configured to be of a size smaller than the cavity 710, yet larger than the remaining posts 708 in the photonic crystal. Alternatively, the cavity can be configured by cutting or shaving the sides of a single post to form a post with a diamond shape from the top view. As an example of modifying the resonator-system of CDF 900 of FIG. 10 so that the degenerate modes and decay rates match, the dielectric region 908 can be configured to be wider at regions adjacent the defects 912 and 914.

In a further exemplary embodiment, a design for a tunable channel drop filter is considered. In every embodiment described heretofore, the channel frequency was determined by the geometry and dielectric constant of the structure, which is fixed upon fabrication. In order to dynamically change the frequency of the channel (i.e. in order to drop a different frequency using the same device), nonlinear materials can be used. The dielectric constants of the resonator-system or of its surroundings can then be configured using electronic, piezo-electric, thermal, or electromagnetic mechanisms such as, but not limited, the electro-optic effect, the charge-carrier effect, and the photoionization of DX centers, allowing the CDF to be tuned. An example of tuning the resonance of a resonator-system using nonlinear materials is described by Villeneuve et al., "Single-mode waveguide microcavity for fast optical switching", Optics Letters, Vol. 21, No. 24, 2017 (1996), incorporated herein by reference.

Channel dropping filters are important components of photonic integrated circuits and optical communication systems. These devices allow the access of one or several frequency channels in a WDM signal, without disturbing the other channels. Heretofore, devices have been presented which employ at least two resonant modes as the coupling element between two waveguides. Using two resonances results in a Lorentzian-shaped transfer lineshape, or response function. At the resonant frequency, the transfer efficiency reaches 100%. As the frequency moves away from the resonant frequency, the transfer efficiency decreases rapidly. In a practical WDM system, there are uncertainties in the resonant frequencies of the filters due to fabrication-related disorders. Also signal frequencies fluctuate due to temperature variations in the light sources. A Lorentzian-shaped transfer function requires a high degree of precision in filter fabrication and frequency stability of the light source.

In contrast, a filter structure with a "flat-top" response function can transfer signals of slightly different frequencies with similar efficiencies, and thereby tolerate a larger amount of structure and temperature variations. Another practical consideration for filter designs concerns the "sidewall" of the lineshape. A Lorentzian function falls off as $(\delta\omega)^{-2}$ far away from the resonant frequency, where $\delta\omega$ is the difference between the signal frequency and resonant frequency of the filter. In some practical systems, faster fall-offs are required to reduce the cross talk between nearby frequency channels.

To address these practical considerations, the invention provides designs of channel drop filters with customized response functions. These structures are constructed by introducing several resonances, and by appropriately adjusting the center frequency and the width of these resonances. As exemplary embodiments, filter structures transfer lineshapes are described which have both the desired "flat top" and "sharp sidewall" characteristics. In addition to its response lineshape, this design also offers the possibility of unique switching functionality. While this description focuses on filter structures which have the "flat top" and "sharp sidewall" response characteristics, it will be appreciated by those skilled in the art that other response functions can also be generated using the structures described hereinafter.

Figure 11:
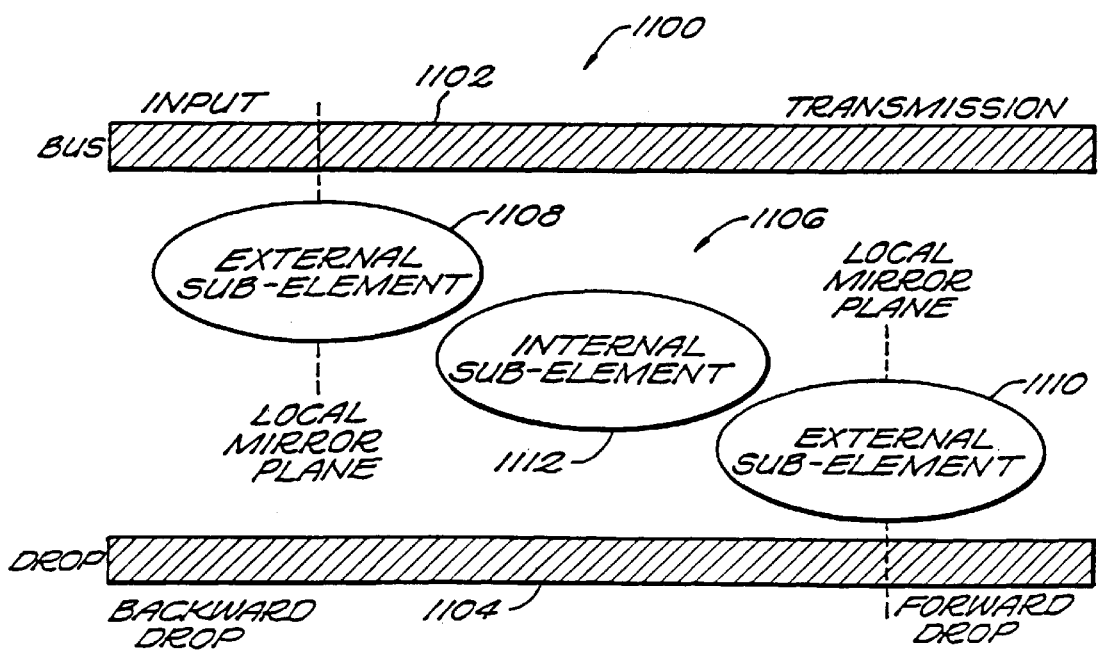
FIG. 11 is a schematic block diagram of a CDF in which the coupling element is composed of external and internal sub-elements.

In order to have transfer lineshape other than Lorentzian, a structure is needed that supports more than two resonances. FIG. 11 is a schematic block diagram of a resonator-system CDF 1100 in accordance with the invention. The CDF 1100 includes an input waveguide 1102, an output waveguide 1104, and a resonator-system 1106 coupled between the waveguides that supports several resonant modes. In order for signal transfer to occur, it is necessary for the resonator-system to consist of at least one external sub-element, which couples directly into the input waveguide. In the illustrated example, there is provided a bus external sub-element 1108 and a drop external sub-element 1110. In the specific case where only one external sub-element is present, the sub-element should couple into both waveguides.

The resonator-system can also contain internal sub-elements 1112 that do not couple directly into the waveguides, but rather only couple with other resonances. Introducing internal sub-elements allows for greater flexibility in designing filters with arbitrary response lineshapes.

Each sub-element supports one or several local resonant modes. A local resonant mode is an eigenmode of the sub-element under the condition that the sub-element is isolated from other parts of the system. Therefore, a local mode is spatially associated with the sub-element. When interactions are present, the local modes are not necessarily eigenmodes of the entire system. Thus, in a CDF structure, the local modes contain either one or several frequency components. The actual positioning of these frequency components is dependent on the nature of the interactions between the sub-elements. Each sub-element can also have a local symmetry, which is defined as the symmetry that is only associated with the sub-element. The local symmetry need not be identical to the symmetry of the overall structure, referred to hereinafter as the global symmetry.

It is necessary for the external sub-element that couples with the bus waveguide (referred to hereinafter as the bus sub-element) to possess a local mirror-plane symmetry perpendicular to the waveguides, and to support at least two local modes with opposite symmetries, i.e., there should be at least one even and at least one odd local modes. In order to achieve zero reflection, the decaying amplitude of these modes into the backward direction should add up to zero. In the case where only two local modes are present, it is necessary for one to be even, while the other one is odd, with respect to the mirror plane. To achieve cancellation of the decaying amplitudes in the backward direction of the bus waveguide, the lineshapes of these two modes must overlap substantially, which in turn requires the corresponding components in these two modes to have substantially the same center frequency and the same width. In the case where more than two local modes are present, it is only necessary for the sum of the decaying amplitudes from all the even modes to cancel the sum of that from all the odd modes.

From energy conservation consideration it follows that, to achieve complete transfer, it is necessary for the energy in the resonator-system to decay into the bus waveguide and the drop waveguide at the same rate. This can be achieved, for example, by having a structure with a mirror plane parallel to the waveguides. To achieve unidirectional transfer into either the forward or the backward direction of the drop waveguide, the external sub-element that couples with the drop waveguide (referred to hereinafter as the drop sub-element) should also have the properties of possessing a local mirror plane and supporting local modes with opposite symmetry.

The transfer lineshape can be customized by adjusting the interaction between the sub-elements, and by adjusting the interaction between the resonator-system and the waveguides. The number of channels that get dropped depends on the frequency spacing between the different channels, and on the width of the CDF transfer function. It may be desirable, in some cases, to increase the width of the transfer function to allow the transfer of more frequency channels. This can be accomplished, for example, by increasing the number of local resonant modes in the resonator system.

To summarize, an embodiment of the invention provides an electromagnetic field frequency filter comprising an input waveguide which carries a signal having a plurality of modes including a desired guided mode and an output waveguide. A resonator-system is coupled between the input and output waveguides which transfers the desired guided mode to the output waveguide and allows transmission of the remaining frequencies through the input waveguides. The resonator-system contains an external sub-element that couples with the input waveguides. The external sub-element possesses a local mirror plane perpendicular to the waveguides, and defines at least two local resonant modes of opposite symmetry with respect to the mirror plane. The resonant modes have components which cancel in the backward direction of the input waveguide, resulting in no reflection.

As an example, consider a structure that can generate a maximum-flat line-shape transfer function. An example of a maximum-flat transfer function T ($\omega$) is defined as:

$$T(\omega) = \frac{\gamma^4}{(\omega - \omega_0)^4 + \gamma^4}, \tag{1}$$

where $\omega_0$ is the center frequency and $\gamma$ is the half width at half maximum. Such a transfer function has both the desired "flat top" and "sharp-sidewall" characteristics. To satisfy the requirements described heretofore, consider a structure that possesses two mirror planes, one parallel and the other one perpendicular to the waveguide as in FIG. 12.

Figure 12:
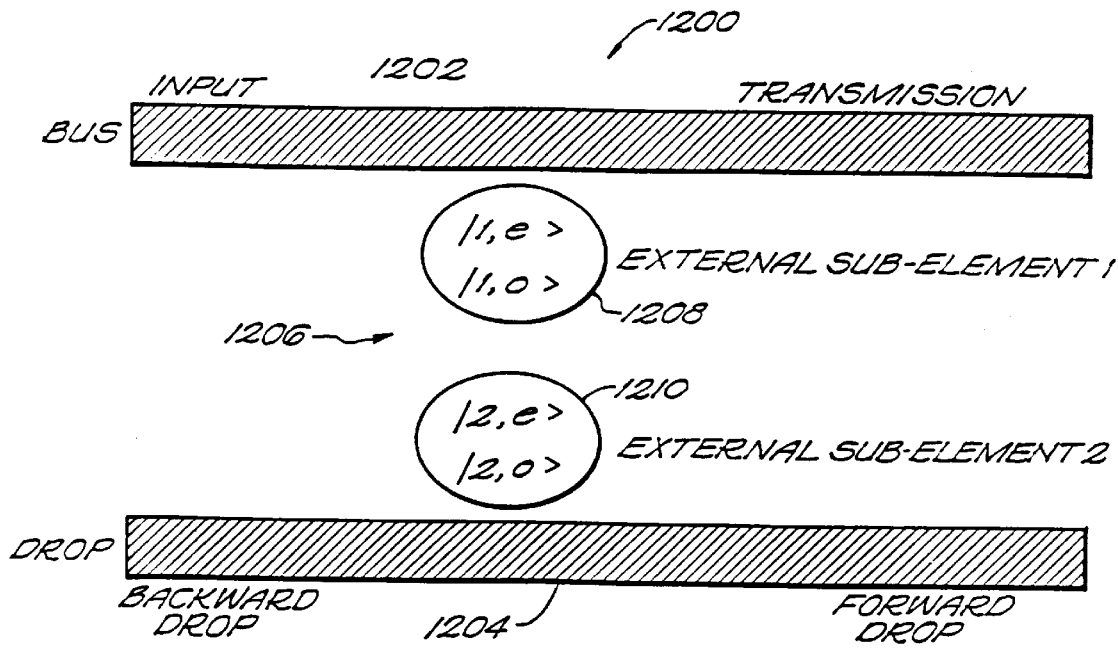
FIG. 12 is a schematic block diagram of a resonator-system CDF with two external sub-elements.

FIG. 12 is a schematic block diagram of a resonator-system CDF 1200. The CDF 1200 has an input waveguide 1202, an output waveguide 1204, and a resonator-system 1206 consisting of two external sub-elements 1208, 1210, and no internal sub-element. Each of the external sub-elements is made up of two cavities (not shown) adjacent to a waveguide and supports two local resonant modes. The sub-element 1208, which couples with the input waveguide 1202, supports an even local mode labelled $|1,e>$, and an odd local mode labelled $|1,o>$. The even and odd properties are defined with respect to the mirror plane perpendicular to the waveguides, which in this example is also the local mirror plane of the sub-elements.

Due to the interaction between the two sub-elements, these local modes are not eigenstates of the overall structure. The four eigenstates of the structure possess different symmetry properties with respect to the two mirror planes and are labelled according to their symmetry properties. The state $|even-odd>$, for example, is even with respect to the mirror plane parallel to waveguide, and odd with respect to the mirror plane perpendicular to the waveguide. Each eigenstate has a Lorentzian lineshape, and is characterized by its center frequency and width.

The local modes can be expanded in terms of the eigenstates of the system. In the case of sub-element 1208, for example, $$|1, e\rangle = \frac{1}{\sqrt{2}}(|even - even\rangle + |odd - even\rangle) \tag{2}$$

$$|1, o\rangle = \frac{1}{\sqrt{2}}(|even - odd\rangle + |odd - odd\rangle). \tag{3}$$

From such an expansion, it will be understood that the lineshape of each local mode is made up of a sum of two Lorentzian functions. In order to achieve zero reflection, these two lineshapes must cancel. Cancellation can be achieved in one of two ways:

Possibility 1:

$$\omega_{even-even} = \omega_{odd-even} \equiv \omega_1, \tag{4}$$

$$\omega_{even-odd} = \omega_{odd-odd} \equiv \omega_2, \tag{5}$$

$$\gamma_{even-even} = \gamma_{odd-even} = \gamma_{even-odd} = \gamma_{odd-odd} = \gamma; \quad (6)$$

Possibility 2:

$$\omega_{even-even} = \omega_{odd-odd} \equiv \omega_1, \quad (7)$$

$$\omega_{even-odd} = \omega_{odd-even} \equiv \omega_2 \quad (8)$$

$$\gamma_{even-even} = \gamma_{odd-even} = \gamma_{even-odd} = \gamma_{odd-odd} \equiv \gamma; \quad (9)$$

where each ω is the center frequency for the corresponding eigenmode, and each γ is the width. In the first scenario, the wave is transferred along the forward direction of the drop waveguide, while in the second scenario the wave is transferred along the backward direction of the drop waveguide.

To achieve a maximum-flat transfer lineshape in both scenarios, the coupling strength between the two sub-elements is adjusted. Such coupling has the effect of splitting the even and odd eigenmodes with respect to the mirror plane parallel to the waveguides. In the case where the frequency splitting is substantially equal to twice of the width of the eigenstates, i.e., $$\omega_1 - \omega_2 = 2\gamma, \quad (10)$$

the structure displays a maximum-flat transfer function.

In addition, the transfer can be entirely eliminated by imposing all four states to have the same frequency and the same width, i.e., $$\omega_{even-even} = \omega_{odd-even} = \omega_{even-odd} = \omega_{odd-odd} \quad (11)$$

$$\gamma_{even-even} = \gamma_{odd-even} = \gamma_{even-odd} = \gamma_{odd-odd} \quad (12)$$

In order to "switch" the transfer from the forward direction to the backward direction, or to eliminate the transfer, one needs to shift the resonant frequency on the order of one width of a resonance peak, which can be as small as one-thousandth of the center frequency. Such a frequency shift is readily achievable using non-linear effects such as, but not limited to, the Kerr effect in semiconductor materials.

Figure 13:
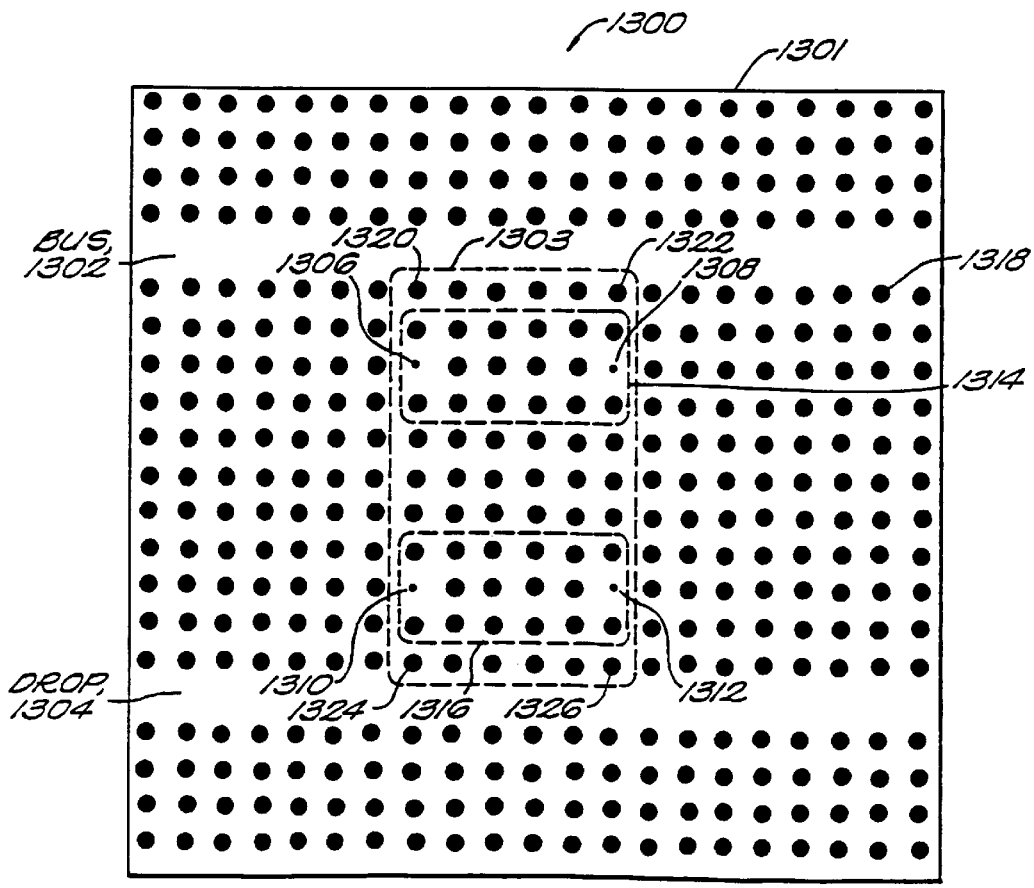
FIG. 13 is a plan view diagram of an exemplary embodiment of a resonator-system photonic crystal CDF with four point defects in accordance with the invention.

FIG. 13 is a plan view diagram of another exemplary embodiment of a resonator-system photonic crystal CDF 1300. The CDF 1300 includes a photonic crystal 1301 having two waveguides, a bus 1302 and a drop 1304. The photonic crystal 1301 is configured as a square lattice of high-index dielectric posts 1318. The posts have a radius of 0.20a and a dielectric constant of 11.56, where a is the lattice constant. Two rows of posts are removed to form the waveguides.

The coupling element between the two waveguides is a resonator-system 1303 which consists of four point defects defining microcavities 1306, 1308, 1310, 1312. The microcavities are made, for example, by decreasing the radius of the four posts from 0.20a. Alternatively, the cavity can be configured by changing the dielectric constant of the four posts. Also, as described above, the photonic crystal can be fabricated with channels or holes of air or material having a contrasting dielectric constant.

The microcavities are grouped into two external sub-elements, a bus sub-element 1314 and a drop sub-element 1316. These sub-elements possess a local mirror plane symmetry perpendicular to the waveguides which, in the illustrated embodiment, is also the mirror plane of the overall structure. There is no internal sub-element in this geometry. The cavities are five lattice constants apart and two lattice constants away from one of the waveguides. Each cavity supports a localized monopole state which is singly degenerate. The even and odd states, as described, are composed of linear combinations of these monopoles.

The quality factor of these symmetric states can be made equal provided that the wavevector k of the guided mode satisfies the relation $k \cdot d = n\pi + \pi/2$, where d is the distance between the defect in the direction parallel to the waveguides, and n is an integer. This condition can be met by separating the defects by five lattice constants, and by choosing the size and dielectric constant of the defect posts in such a way that the guided mode at the resonant frequency has a wavevector of $0.25\,(2\pi a^{-1})$.

The monopoles are coupled indirectly through the waveguides, and directly through the photonic crystal along the x-direction. Each coupling mechanism splits the frequencies (i.e. breaks the degeneracy) of states of different symmetries with respect to the mirror plane perpendicular to the waveguide, but with an opposite sign. The exact cancellation between the two coupling mechanisms is ensured by changing the dielectric constant, size and/or shape of selected rods, such as posts 1320, 1322, 1324, 1326, in the photonic crystal from 11.56 to 7.5, as shown in FIG. 13. The distance between the cavities in the y-direction is chosen to be four lattice constant to ensure the appropriate splitting in frequency between the states with opposite symmetries with respect to the mirror plane parallel to the waveguides.

Figure 14:
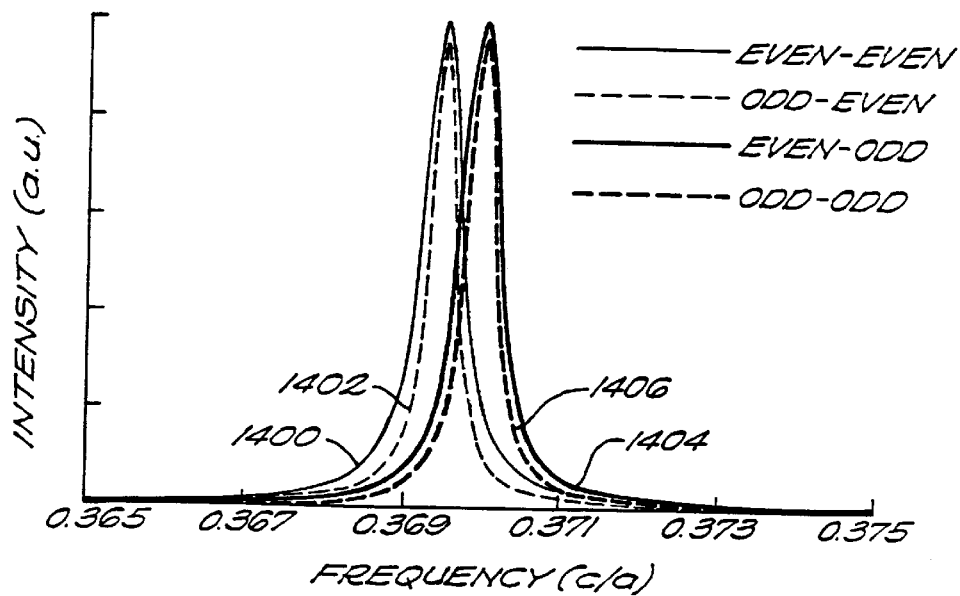
FIG. 14 is a graph of the frequency spectrum of the even-even, odd-even, even-odd, and odd-odd modes for the CDF of FIG. 13.

The filter response of the structure shown in FIG. 13 can be computed using a finite-difference time-domain scheme. A pulse is sent down one of the waveguides and excites the resonant states. These resonant states then decay exponentially into the waveguides. By Fourier transforming the decaying amplitudes, the frequency spectrum of all the symmetric states can be found, each with a Lorentzian lineshape. FIG. 14 is a graph of the frequency spectrum of the even-even, odd-even, even-odd, and odd-odd modes for the CDF 1300 of FIG. 13. As required, the lineshapes of the even-even 1400 and odd-even 1402 states overlap almost completely, as well as the lineshapes of the even-odd 1404 and odd-odd 1406 states. The center frequency of the even-even state is separated from the center frequency of the even-odd state by twice the width of the resonant peak, as desired.

Figure 15A:
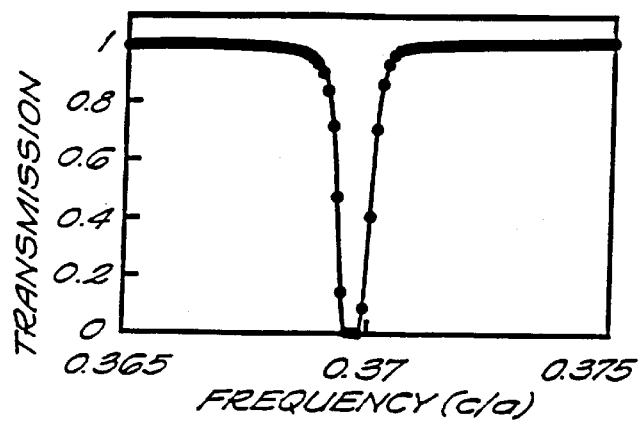
FIGS. 15A–15C are graphs of the intensity spectrum of a transmitted signal in the bus, the intensity spectrum of a transmitted signal in the forward drop, and the intensity spectrum of a transmitted signal in the backward drop, respectively, of the CDF of FIG. 13.
Figure 15B:
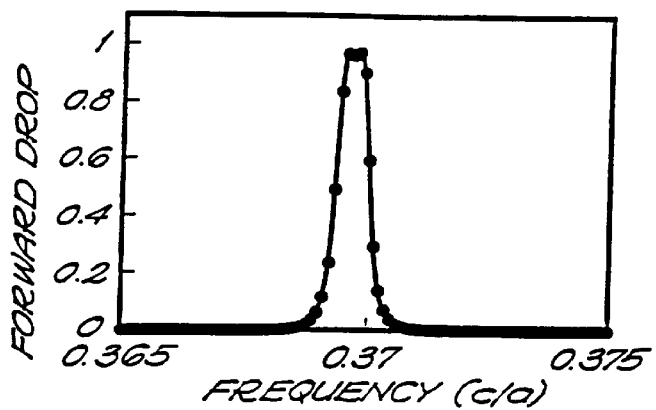
Figure 15C:
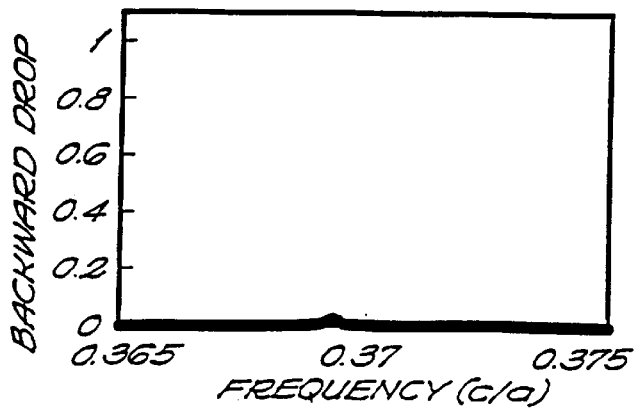

The spectrum of the signal in the forward and backward drops are shown in FIGS. 15A–15C along with the spectrum of the transmitted signal. FIGS. 15A–15C are graphs of the intensity spectrum of a transmitted signal in the bus, the intensity spectrum of a transmitted signal in the forward drop, and the intensity spectrum of a transmitted signal in the backward drop, respectively, of the CDF 1300 of FIG. 13. The transmission is close to 100% over the entire spectrum, except in the neighborhood of the center frequency, where it drops to 0% (FIG. 15A). The forward drop reaches a maximum close to 99% at the center frequency (FIG. 15B). The backward drop shows almost complete absence of signal (FIG. 15C). The transfer lineshape does indeed show the maximum-flat characteristics, i.e., flattening of the top at the resonance peak and sharp fall-off of the transfer amplitude away from the center frequency.

Figure 16:
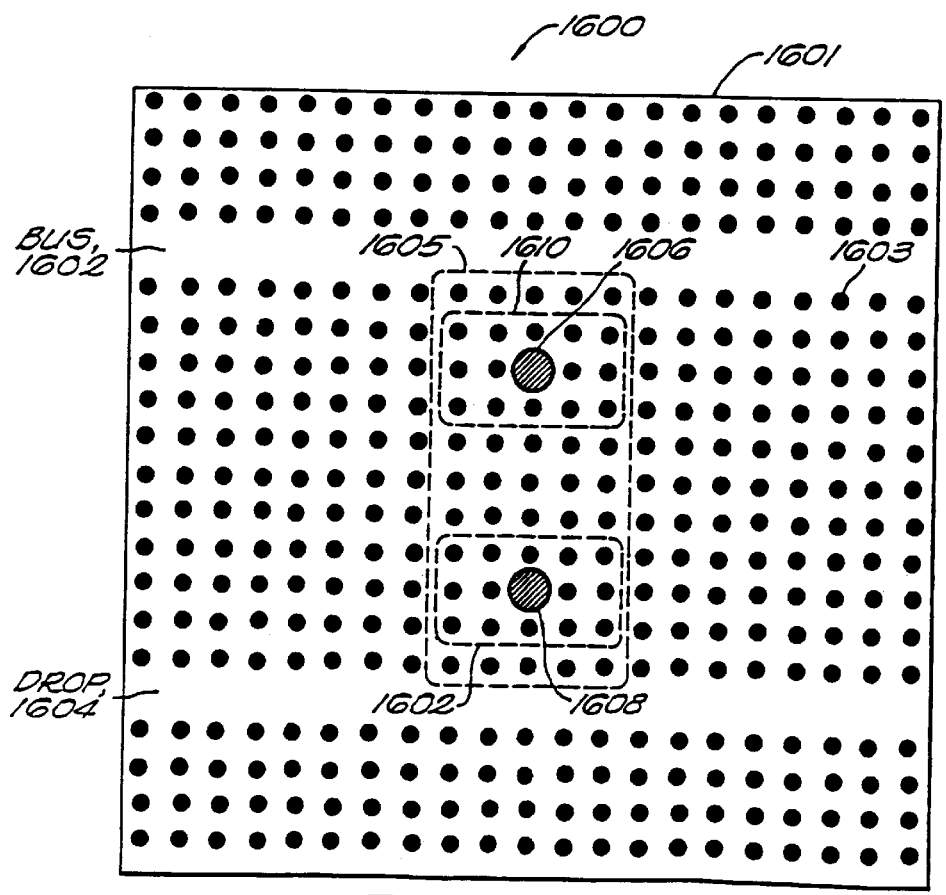
FIG. 16 is a plan view diagram of an exemplary embodiment of a resonator-system photonic crystal CDF with two point defects aligned perpendicularly to the associated waveguides.

FIG. 16 is a plan view diagram of another exemplary embodiment of a resonator-system photonic crystal CDF 1600. The CDF 1600 is configured from a photonic crystal 1601 of a square lattice of high-index dielectric posts 1603, with a bus waveguide 1602 and a drop waveguide 1604. In this embodiment, the coupling element between the two waveguides is a resonator-system 1605 which consists of two point defects defining two cavities 1606, 1608, each supporting doubly degenerate modes (i.e. two modes with the same frequency). The respective centers of the point defects are aligned to an axis that is perpendicular to the waveguides. Each of the cavities defines an external sub-element, a bus sub-element 1610 and a drop sub-element 1612. There is no internal sub-element in this structure.

The cavities 1606, 1608 are made by increasing the radius of two rods from 0.20a to 0.60a. The symmetric modes are composed of linear combinations of all the modes. The frequencies of the symmetric modes can be tuned by changing the shape and dielectric constant of the defect rods, and/or the rods that are in the nearest neighbor position to the defects. In addition, the splitting of frequencies between modes with different symmetries with respect to the mirror plane parallel to the waveguides can be adjusted by changing the distance between the defects, and by changing the shape or dielectric constants of the rods lying between the cavities. Using these tuning mechanisms, the resonant frequencies can be placed at approximate positions to achieve a complete transfer into the forward direction with a maximum flat transfer lineshape.

Figure 17:
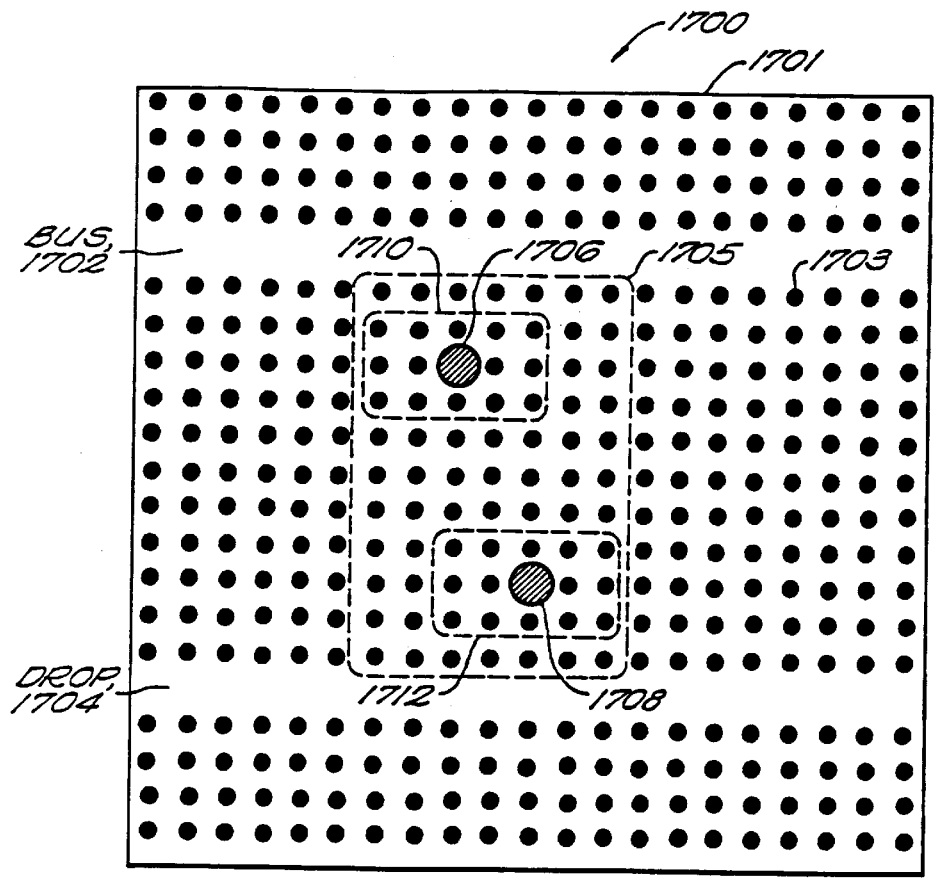
FIG. 17 is a plan view diagram of an exemplary embodiment of a resonator-system photonic crystal CDF with two point defects having local symmetry but not global symmetry.

FIG. 17 is a plan view diagram of another exemplary embodiment of a resonator-system photonic crystal CDF 1700. The CDF 1700 is configured from a photonic crystal 1701 of a square lattice of high-index dielectric posts 1703, with a bus waveguide 1702 and a drop waveguide 1704. In this embodiment, the coupling element between the two waveguides is a resonator-system 1705 which consists of two point defects defining two cavities 1706, 1708.

The CDF 1700 contains two external sub-elements. Each of the cavities defines an external sub-element, a bus sub-element 1710 and a drop sub-element 1712. There is no internal sub-element in this structure. Each of these sub-elements possesses a local mirror plane, and consists of a single defect that supports two local resonances with opposite symmetries with respect to the local mirror plane. In contrast to the previous embodiments, there is no global mirror plane in the structure. In order to achieve complete transfer, the lineshapes of the even and the odd local modes need to be cancelled. This can be achieved, for example, by changing the dielectric constant or the size of the posts adjacent to the cavities. By adjusting the dielectric constant or the size of the rods lying between the cavities, the coupling between the local resonances in the two cavities can be adjusted.

Figure 18:
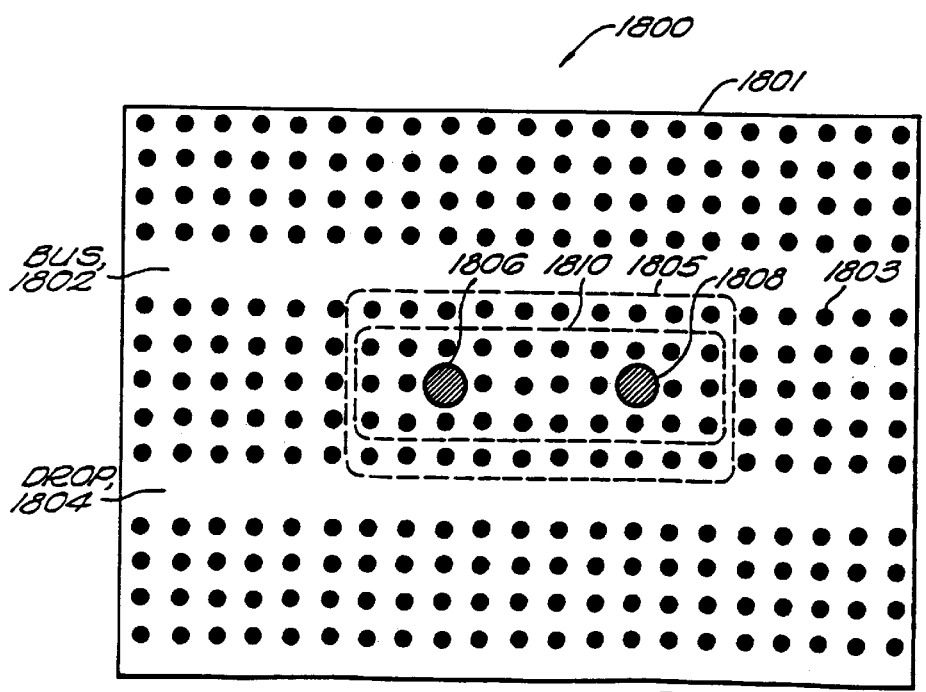
FIG. 18 is a plan view diagram of an exemplary embodiment of a resonator-system photonic crystal CDF with two point defects aligned parallel to the associated waveguides.

FIG. 18 is a plan view diagram of another exemplary embodiment of a resonator-system photonic crystal CDF 1800. The CDF 1800 is configured from a photonic crystal 1801 of a square lattice of high-index dielectric posts 1803, with a bus waveguide 1802 and a drop waveguide 1804. In this embodiment, the coupling element between the two waveguides is a resonator-system 1805 which consists of two point defects defining two cavities 1806, 1808, each supporting two doubly degenerate modes (i.e. two modes with the same frequency). The respective centers of the point defects are aligned along an axis that is parallel to the waveguides. Each of the cavities defines a single external sub-element 1810. There is no internal sub-element in this structure.

The geometry of CDF 1800 introduces an indirect coupling pathway between the cavities, which could be used to tune the resonant frequencies of the symmetric modes, in addition to the other mechanisms present in the previous embodiments. With this additional mechanism, a complete transfer into either the forward or the backward direction can be achieved. Also the transfer can be eliminated completely.

Figure 19:
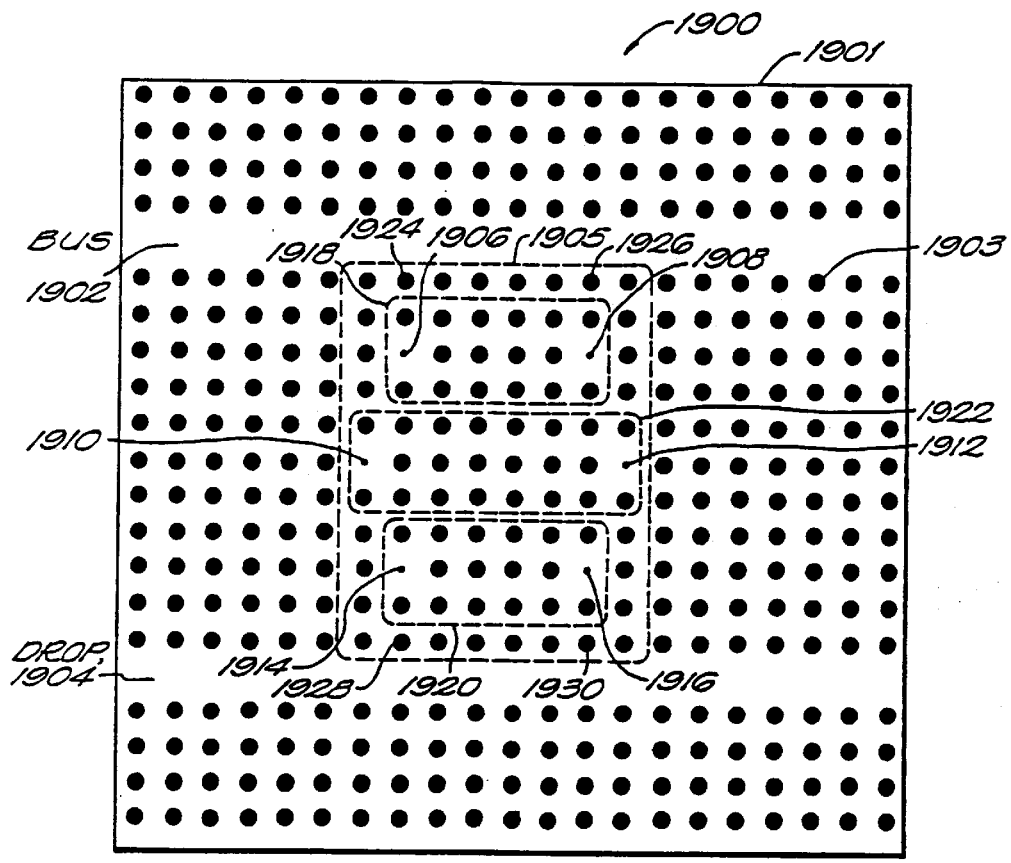
FIG. 19 is a plan view diagram of an exemplary embodiment of a resonator-system photonic crystal CDF with six point defects.

FIG. 19 is a plan view diagram of another exemplary embodiment of a resonator-system photonic crystal CDF 1900. The CDF 1900 is configured from a photonic crystal 1901 of a square lattice of high-index dielectric posts 1903, with a bus waveguide 1902 and a drop waveguide 1904. In this embodiment, the coupling element between the two waveguides is a resonator-system 1905 which consists of six point defects defining six cavities 1906, 1908, 1910, 1912, 1914, 1916, each of which supports a singly degenerate resonance.

The CDF 1900 contains two external sub-elements. The cavities 1906 and 1908 define an external bus sub-element 1918, and the cavities 1914 and 1916 define an external drop sub-element 1920. The two cavities 1910, 1912 in the center do not couple directly to the waveguides, but rather only couple to the waveguides through other cavities. This structure is an example of a CDF with an internal sub-element 1922. In this case, the presence of the internal sub-element does not affect the overlap of the even and odd local states of the external sub-elements, but rather only changes the frequencies of the even and odd states. By adjusting the distance between the cavities and the dielectric constants of the rods lying between the cavities, more complex lineshapes such as the Butterworth function can be achieved. In addition, the exact cancellation between the coupling mechanisms is ensured by changing the dielectric constant, size and/or shape of selected rods, such as posts 1924, 1926, 1928, 1930 in the photonic crystal.

Figure 20:
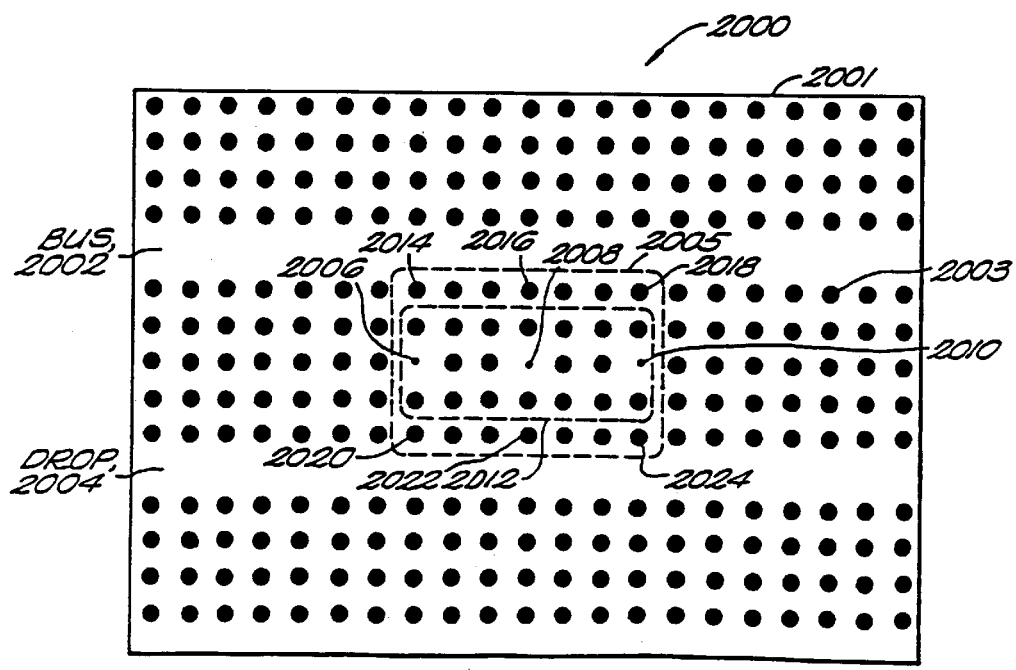
FIG. 20 is a plan view diagram of an exemplary embodiment of a resonator-system photonic crystal CDF with three cavities.

FIG. 20 is a plan view diagram of another exemplary embodiment of a resonator-system photonic crystal CDF 2000. The CDF 2000 is configured from a photonic crystal 2001 of a square lattice of high-index dielectric posts 2003, with a bus waveguide 2002 and a drop waveguide 2004. In this embodiment, the coupling element between the two waveguides is a resonator-system 2005 which consists of three point defects defining three cavities 2006, 2008, 2010. The respective centers of the point defects are aligned along an axis that is parallel to the waveguides. The cavities define a single external sub-element 2012. There is no internal sub-element in this structure.

In contrast to the previously illustrated embodiments, the external sub-element 2012 of this structure contains three local resonances, one odd, the other two even, with respect to the mirror plane perpendicular to the waveguides. Since there is only one external sub-element and no internal sub-element, these local modes are eigenstates of the entire filter structure. Complete transfer can occur if the lineshape function of the odd mode cancels the sum of the lineshape of the two even modes. This can be achieved by having the center frequency of the odd modes lying between the center frequencies of the two even modes, and by having the width of the odd modes larger than the width of the two even modes. The relative position of the frequencies of the even and odd modes can be adjusted by changing the dielectric constant or the size of the center cavity, since the even modes have a large amplitude while the odd mode has a small amplitude in the center cavity. The width of these modes can be adjusted by changing the distance between the cavities. The exact cancellation in the coupling mechanism is ensured by changing the dielectric constant, size and/or shape of selected rods, such as posts 2014, 2016, 2018, 2020, 2022, 2024, in the photonic crystal. Preferably, the posts 2016 and 2022 will be altered in a manner different than the alteration of the remaining posts 2014, 2018, 2020, 2024.

Figure 21:
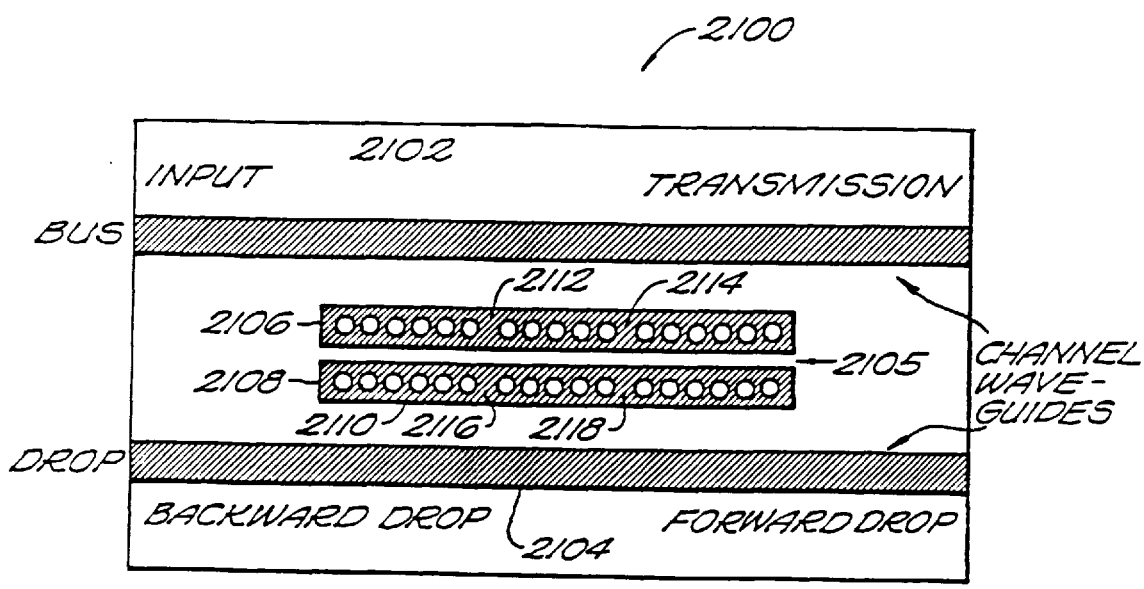
FIG. 21 is a plan view diagram of another alternative exemplary embodiment of a resonator-system CDF utilizing conventional channel waveguides with a photonic crystal having four microcavities.

FIG. 21 is a plan view diagram of another alternative exemplary embodiment of a resonator-system CDF 2100. The CDF 2100 utilizes conventional channel bus 2102 and drop 2104 waveguides made of high dielectric material with a resonator-system 2105 configured from a photonic crystal. The CDF 2100 is a case with radiation losses.

The resonator-system 2105 is made of two dielectric regions 2106, 2108, each consisting of a periodic series of holes 2110. For each region, within the array of holes, two defects 2112, 2114, 2116, 2118 have been introduced by breaking the periodicity. These defects act like microcavities. In contrast to the two previously illustrated embodiments, where there were no radiation losses, the two defect states decay into both radiation modes and waveguide modes. The condition for achieving maximum transfer to the forward direction with the maximum-flat lineshape, in the presence of radiation loss, therefore becomes:

$$\omega_{even-even} = \omega_{odd-even} = \omega_{even} \quad (13)$$

$$\omega_{even-odd} = \omega_{odd-odd} = \omega_{odd} \quad (14)$$

$$\gamma_{even-even} = \gamma_{odd-even} = \gamma_{even-odd} = \gamma_{odd-odd} = \gamma \quad (15)$$

$$\gamma^*_{even-even} = \gamma^*_{odd-even} = \gamma^*_{even-odd} = \gamma^*_{odd-odd} \gamma^* \quad (16)$$

$$\omega_{even} - \omega_{odd} = 2\gamma \quad (17)$$

where each ω is the center frequency for the corresponding eigenmode, each γ is the width of the resonance peak, and each γ* is the width of the resonance peak due only to the energy dissipation into the waveguides.

It will be appreciated by those skilled in the art that the number of channels that get dropped depends on the frequency spacing between the different channels, and on the width of the CDF transfer function. It may be desirable, in some cases, to increase the width of the transfer function to allow the transfer of more frequency channels. This can be accomplished, for example, by increasing the number of local resonant modes in the resonator system.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. An electromagnetic field frequency filter comprising:
   an input waveguide which carries a signal having at least one frequency including at least one desired frequency;
   an output waveguide; and
   a photonic crystal resonator-system coupled between said input and output waveguides which transfers said at least one desired frequency to said output waveguide and allows transmission of undesired frequencies through said input waveguide.

2. The filter of claim 1, wherein said photonic crystal resonator-system comprises at least two single-mode resonators.

3. The filter of claim 1, wherein said photonic crystal resonator-system comprises at least one resonator with two resonant modes of opposite symmetry.

4. The filter of claim 1, wherein said photonic crystal resonator-system comprises a periodic dielectric structure having at least one defect defining at least one resonator.

5. The filter of claim 1, wherein said photonic crystal resonator-system and said waveguides are integrated into a single photonic crystal.

6. The filter of claim 1, wherein said resonator-system is comprised of resonators, and defines at least two system modes, said system modes consisting in part of a linear combination of resonant modes of said resonators, said resonator-system being specifically configured such that at least two of said system modes have substantially the same frequency.

7. The filter of claim 6, wherein each of said at least two system modes has substantially the same energy dissipation rate into said waveguides.

8. The filter of claim 6, wherein said at least two system modes dissipate into each of said input and output waveguides at substantially the same energy dissipation rate.

9. The filter of claim 6, wherein each of said system modes dissipates at substantially the same energy dissipation rate.

10. The filter of claim 6, wherein said at least two system modes comprise an even system mode and an odd system mode.

11. A photonic crystal comprising:
    an input waveguide which carries a signal having at least one frequency including at least one desired frequency;
    an output waveguide; and
    a resonator-system coupled between said input and output waveguides which transfers said at least one desired frequency to said output waveguide and allows transmission of undesired frequencies through said input waveguide.

12. The photonic crystal of claim 11, wherein said resonator-system comprises at least two single-mode resonators.

13. The photonic crystal of claim 11, wherein said resonator-system comprises at least one resonator with two resonant modes of opposite symmetry.

14. The photonic crystal of claim 11, wherein said resonator-system comprises a periodic dielectric structure having at least one defect defining at least one resonator.

15. The filter of claim 11, wherein said resonator-system is comprised of resonators, and defines at least two system modes, said system modes consisting in part of a linear combination of resonant modes of said resonators, said resonator-system being specifically configured such that at least two of said system modes have substantially the same frequency.

16. The filter of claim 15, wherein each of said at least two system modes has substantially the same energy dissipation rate into said waveguides.

17. The filter of claim 15, wherein said at least two system modes dissipate into each of said input and output waveguides at substantially the same energy dissipation rate.

18. The filter of claim 15, wherein each of said system modes dissipates at substantially the same energy dissipation rate.

19. The filter of claim 15, wherein said at least two system modes comprise an even system mode and an odd system mode.

20. An electromagnetic field frequency filter comprising:
    an input waveguide which carries a signal having at least one frequency including at least one desired frequency;
    an output waveguide;
    a resonator-system coupled between said input and output waveguides which transfers said at least one desired frequency to said output waveguide and allows transmission of undesired frequencies through said input waveguide, said resonator-system being comprised of resonators, and defining at least two system modes of opposite symmetry, said system modes consisting in part of a linear combination of resonant modes of said resonators, said resonator-system being specifically configured such that at least two of said system modes have substantially the same frequency.

21. The filter of claim 20, wherein said specific configuration of resonator-system is accomplished by changing geometry.

22. The filter of claim 20, wherein said specific configuration of resonator-system is accomplished by changing refractive index.

23. The filter of claim 20, wherein each of said at least two system modes has substantially the same energy dissipation rate into said waveguides.

24. The filter of claim 20, wherein said at least two system modes comprise an even system mode and an odd system mode.

25. The filter of claim 20, wherein said at least two system modes dissipate into each of said input and output waveguides at substantially the same energy dissipation rate.

26. The filter of claim 20, wherein each of said at least two system modes dissipates at substantially the same energy dissipation rate.

27. The filter of claim 20, wherein said system modes combine with one another and the signal such that transmission of said desired frequency is prevented in said input waveguide and allowed in said output waveguide.

28. The filter of claim 20, wherein said system modes combine with one another such that reflection of said desired frequency into said input waveguide is canceled.

29. The filter of claim 20, wherein said system modes combine so as to decay into said output waveguide in a predetermined direction to transfer said desired frequency.

30. The filter of claim 29, wherein said system modes combine with one another so as to cancel in an opposite direction of said output waveguide.

31. An electromagnetic field frequency filter comprising:
an input waveguide which carries a signal having at least one frequency including at least one desired frequency;
an output waveguide; and
a resonator-system coupled between said input and output waveguides which transfers the at least one desired frequency to said output waveguide and allows transmission of undesired frequencies through said input waveguide, said resonator-system including at least one external sub-element that couples with said input waveguide, said external sub-element including at least two resonators that couple directly to said input waveguide with similar coupling strength and that further couple directly with each other, said at least two resonators supporting no more than one resonant mode at or near said desired frequency.

32. The filter of claim 31, wherein said external sub-element has only two resonators.

33. The filter of claim 31, wherein said resonator-system comprises at least one external sub-element that couples directly with said output waveguide.

34. The filter of claim 31, wherein said resonator-system comprises at least one internal sub-element that couples directly with said external sub-element but not directly with said input waveguide.

35. The filter of claim 31, wherein said external sub-element has a local mirror plane perpendicular to the waveguides.

36. An electromagnetic field frequency filter comprising:
an input waveguide which carries a signal having at least one frequency including at least one desired frequency;
an output waveguide; and
a resonator-system coupled between said input and output waveguides and including at least two resonators that couple directly to said input waveguide with similar coupling strength and that further couple directly with each other, said at least two resonators each supporting no more than one resonant mode at or near said desired frequency, such that said at least one desired frequency is transferred to said output waveguide.

37. The filter of claim 36, wherein said resonator-system is configured by changing geometry.

38. The filter of claim 36, wherein said resonator-system is configured by changing refractive index.

39. The filter of claim 36, wherein said resonator-system allows transmission of undesired frequencies through said input waveguide.

40. The filter of claim 36, wherein said resonator-system supports at least two system modes, said system modes consisting in pan of a linear combination of said resonant modes of said resonators.

41. The filter of claim 40, wherein said system modes combine with one another and the signal such that transmission of said desired frequency is prevented in said input waveguide and allowed in said output waveguide.

42. The filter of claim 40, wherein said system modes combine with one another such that reflection of said desired frequency into sad input waveguide is canceled.

43. The filter of claim 40, wherein said system modes combine so as to decay into said output waveguide in a predetermined direction to transfer said desired frequency.

44. The filter of claim 43, wherein said system modes combine with one another so as to cancel in the opposite direction of said output waveguide.

45. The filter of claim 40, wherein said at least two system modes have substantially the same frequency.

46. The filter of claim 40, wherein each of said at least two system modes has substantially the same energy dissipation rate into said waveguides.

47. The filter of claim 40, wherein said at least two system modes have substantially the same frequency and substantially the same energy dissipation rate into said waveguides.

48. The filter of claim 40, wherein said at least two system modes comprise an even system mode and an odd system mode.

49. The filter of claim 40, wherein said at least two system modes dissipate into each of said input and output waveguides at substantially the same energy dissipation rate.

50. The filter of claim 40, wherein each of said system modes dissipates at substantially the same energy dissipation rate.

51. The filter of claim 40, wherein said resonator-system defines only two system modes.

52. A method of selectively transferring electromagnetic fields between a first and a second waveguide, said electromagnetic fields propagating along the forward direction in said first waveguide, said electromagnetic fields having desired frequencies which are transferred to said second waveguide, and undesired frequencies which are transmitted along said forward direction in said first waveguide, comprising:
providing a resonator-system side-coupled to said waveguides, said resonator-system being comprised of resonators, and defining at least two system modes, said system modes consisting in part of a linear combination of resonant modes of said resonators; and
specifically configuring said resonator-system such that at least two of said system modes have substantially the same frequency.

* * * * *